(12) United States Patent
Gillis et al.

(10) Patent No.: US 6,252,240 B1
(45) Date of Patent: Jun. 26, 2001

(54) VEHICLE OCCUPANT DISCRIMINATION SYSTEM AND METHOD

(76) Inventors: Edward J. Gillis, 822 Norchester, South Lyon, MI (US) 48178; Naveed Mahbub, 35210- Drakeshire Pl. #204, Farmington, MI (US) 48335; Michael E. Farmer, 5119 Lake Bluff Rd., West Bloomfield, MI (US) 48331; James A. Campbell, 7136 Plymouth Rd., Ann Arbor, MI (US) 48105; J. Gregory Stanley, 21945 Daleview Dr., Novi, MI (US) 48374

( * ) Notice: Subject to any disclaimer, the term of this patent is extended or adjusted under 35 U.S.C. 154(b) by 0 days.

(21) Appl. No.: 09/066,547

(22) Filed: Apr. 24, 1998

Related U.S. Application Data

(60) Provisional application No. 60/044,829, filed on Apr. 25, 1997.

(51) Int. Cl.$^7$ .................................................. G01N 21/86
(52) U.S. Cl. .................. 250/559.38; 280/735; 307/10.1; 701/45; 250/221
(58) Field of Search .......................... 250/559.38, 221, 250/559.4; 280/735; 307/10.1; 701/45; 180/271, 272, 273, 282

(56) References Cited

U.S. PATENT DOCUMENTS

| | | | |
|---|---|---|---|
| 5,071,160 | 12/1991 | White et al. | 280/735 |
| 5,118,134 | 6/1992 | Mattes et al. | 280/735 |
| 5,232,243 | 8/1993 | Blackburn et al. | 280/732 |
| 5,398,185 | 3/1995 | Omura | 364/424.05 |
| 5,411,289 | 5/1995 | Smith et al. | 280/735 |
| 5,413,378 | 5/1995 | Steffens et al. | 280/735 |
| 5,439,249 | 8/1995 | Steffens et al. | 280/735 |
| 5,446,661 | 8/1995 | Gioutsos et al. | 364/424.05 |
| 5,454,591 | 10/1995 | Mazur et al. | 280/735 |
| 5,482,314 | 1/1996 | Corrado et al. | 280/735 |
| 5,490,069 | 2/1996 | Gioutsos et al. | 364/424.05 |
| 5,494,311 | 2/1996 | Blackburn et al. | 280/735 |
| 5,531,472 | 7/1996 | Semchena et al. | 280/735 |
| 5,573,269 | 11/1996 | Gentry et al. | 280/735 |
| 5,624,132 | 4/1997 | Blackburn et al. | 280/735 |
| 5,626,359 | 5/1997 | Steffens et al. | 280/735 |
| 5,653,462 | 8/1997 | Breed et al. | 280/735 |
| 5,829,782 | * 11/1998 | Breed et al. | 280/735 |

* cited by examiner

Primary Examiner—Que T. Le
Assistant Examiner—Thanh X. Luu
(74) Attorney, Agent, or Firm—Lyon PC

(57) ABSTRACT

An occupant discrimination system incorporates a position sensor for measuring the distance from a fixed structure within the vehicle to a first surface of an occupant or object on a vehicle seat, and a seat weight sensor for measuring the weight of the occupant or object. The position sensor generates a plurality of signal components that are combined with the weight and vehicle speed related measurements so as to form a signal space, from which a plurality of measures are calculated. A plurality of seat occupancy scenarios are defined and the likelihood of each seat occupancy scenario is functionally related to the plurality of measures. For a given measure state, the likelihood of each of the seat occupancy scenarios is calculated, and the most likely scenario is used to govern the control of a safety restraint system.

7 Claims, 22 Drawing Sheets

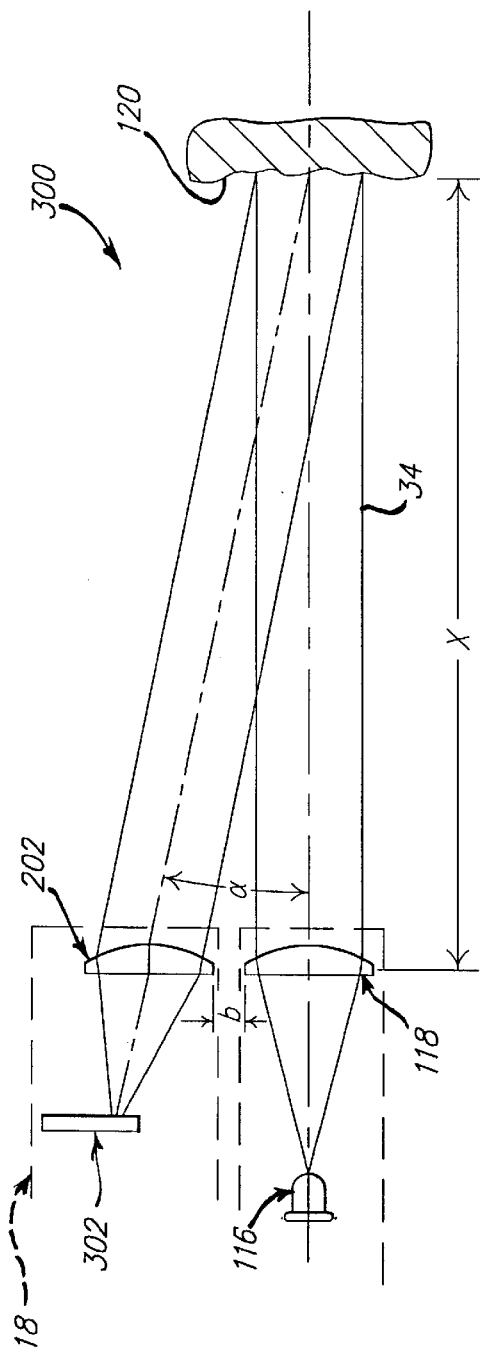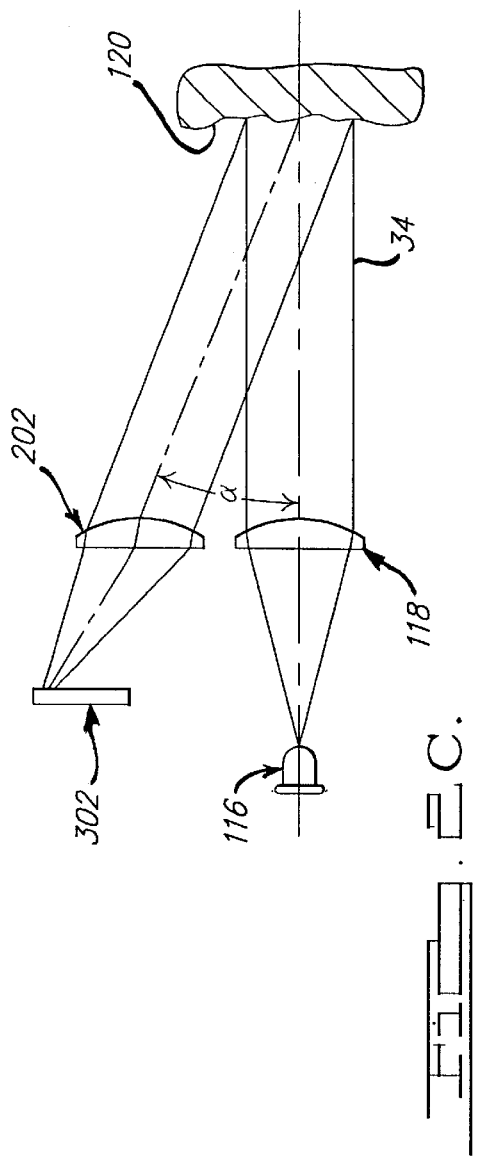
FIG. 2A.
FIG. 2C.

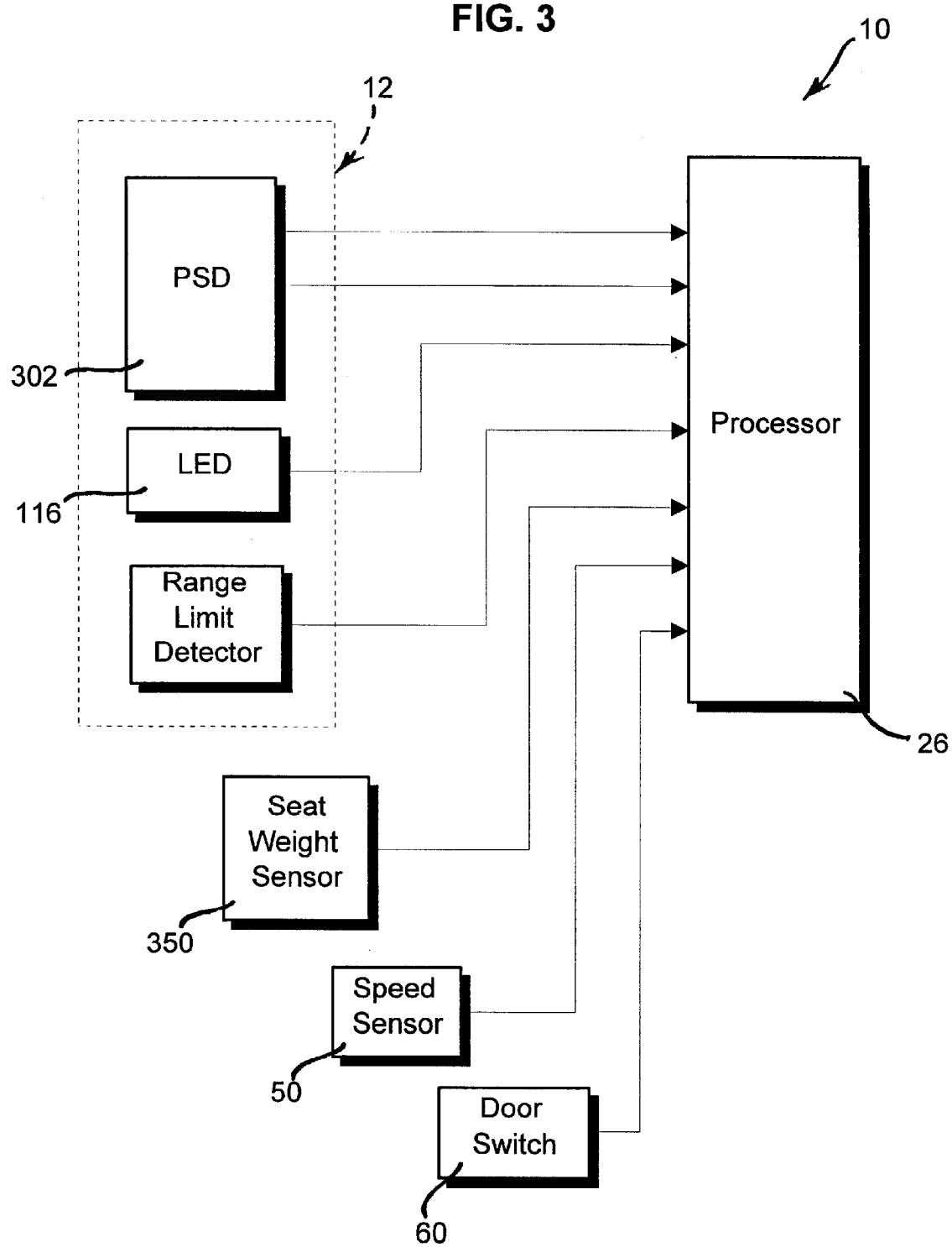

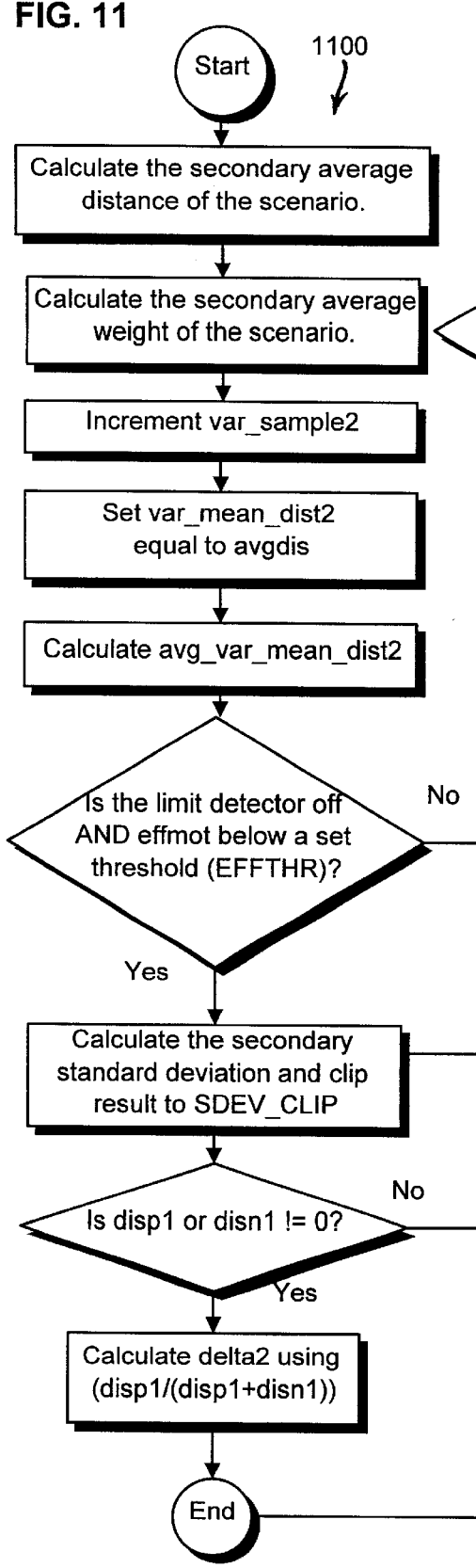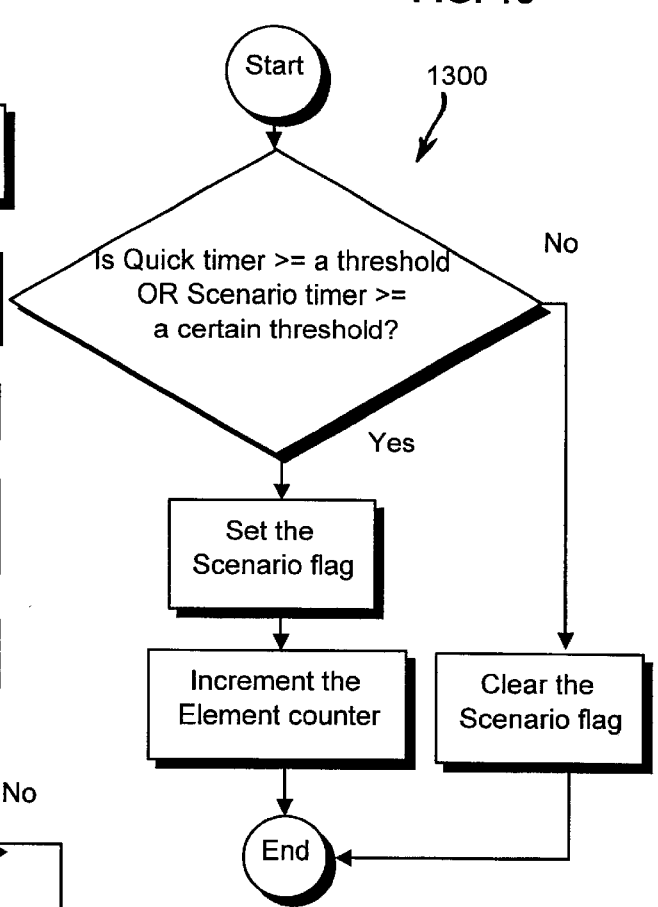

VEHICLE OCCUPANT DISCRIMINATION SYSTEM AND METHOD

CROSS-REFERENCE TO RELATED APPLICATIONS

The instant application claims the benefit of prior U.S. Provisional Application Ser. No. 60/044,829 filed on Apr. 25, 1997.

TECHNICAL ART

The instant invention generally relates to systems and methods for discriminating the seat occupancy configuration in a vehicle for purposes of controlling the activation of a safety restraint system.

BACKGROUND OF THE INVENTION

Recently, the automotive industry has been faced with the challenge of designing a vehicle airbag deployment system which can inhibit deployment of the airbag in situations where allowing deployment increases the likelihood of causing harm to an occupant, such as where a rear-facing infant seat is located in the front passenger seat. Examples of such attempts or proposals include: (1) manually actuated switches for enabling/disabling air bags; (2) magnetic or inductive "tags" that must be affixed to a rear-facing infant seat; and (3) capacitance sensors to distinguish humans from inanimate objects, or weight threshold sensors that disable the air bag below a predetermined threshold weight (such as 25 pounds).

However, none of these arrangements has proven entirely satisfactory. More specifically, manually actuated switches are subject to human forgetfulness or inattention. Tag systems have to be retroactively affixed to all existing rear-facing infant seats. Capacitive and weight sensing systems have not achieved acceptable levels of reliability.

SUMMARY OF THE INVENTION

The instant invention overcomes the above-noted problems by providing a vehicle occupant discrimination system and method which is capable of differentiating rear-facing infant seats from people so that deployment of passenger-side air bags can be controlled depending on whether a rear-facing infant seat or larger human is present.

The system and method of the instant invention reliably distinguishes humans from infant seats without any action on the part of the driver or other person. The instant invention examines a variety of information, such as from separate optical, weight, speed, and door switch sensors, to determine factors such as distance between the airbag and the object located in the seat, small amplitude motions such as breathing, large scale motions, and weight. The instant invention tracks current and past information concerning these factors to accurately discriminate between people and infant seats.

In accordance with the instant invention, a vehicle occupant discrimination system and method comprises an algorithm programmed into processor that processes information produced by an optical sensor, such as a sensor utilizing a collimated and modulated optical beam produced by an LED, which is reflected from a surface and imaged by a lens onto a position sensitive detector (PSD). A range limit detector can also be utilized to provide an indication when the reflecting surface is too close to the PSD to produce a reading. The position of the imaged light on the PSD is used to compute distance to the reflecting surface from a fixed structure within the interior of the vehicle. As discussed more fully hereinbelow, the instant invention also preferably processes information from other inputs such as a seat weight sensor, a speed sensor, and a door switch.

The system and method of the instant invention tracks distance, patterns of motion, and weight over time and processes to determine the likelihood of various predefined seat occupancy scenarios. As a particular scenario becomes "older," the discrimination thereof becomes more reliable. Examples of particular seat occupancy scenarios include an empty seat, a seat with a rear facing infant seat (RFIS), a normally seated occupant, and a normally seated occupant holding a newspaper or map.

The signals from the optical sensor are identified as follows:

1. Inside channel signal (I): this is the signal from the inside end of the PSD chip. The signal level gets higher as the distance to the target gets higher;
2. Outside channel signal (O): this is the signal form the outside end of the PSD chip. The signal level gets lower as the distance to the target gets higher;
3. LED signal: this is the value of the driving voltage of the LED; and
4. Limit detector signal: this switch signal becomes high when the target is closer than a threshold.

In addition, processor receives weight information from the weight sensor and speed information from the speed sensor. The door switch is used for instantaneous recognition of new scenarios.

In accordance with a first and preferred embodiment of the instant invention, the following four measures are calculated from the input signals:

($M_0$) Mean distance (avgda);
($M_1$) Variance of the distance ($\sigma^2$);
($M_2$) Mean weight (w); and
($M_3$) Slant measure ($\delta$).

These measures are reset at the onset of a new scenario and therefore the recognition of a new scenario is a key factor.

An associated scenario sample space $\{S_i\}$ is divided into the following three categories:

($S_0$) Rear Facing Infant Seat (RFIS);
($S_1$) Empty Seat;
($S_2$) Person Seated Normally (PSN);

In accordance with a second embodiment of the instant invention, the following five measures are calculated from the input signals:

($M_0$) Mean distance (avgda);
($M_1$) Maximum distance (Xmax);
($M_2$) Variance of the distance ($\sigma^2$);
($M_3$) Mean weight (w); and
($M_4$) Slant measure ($\delta$).

The associated scenario sample space $\{S_i\}$ is divided into the following eight categories:

($S_0$) Rear Facing Infant Seat (RFIS);
($S_1$) Front Facing Infant Seat (FFIS);
($S_2$) Object;
($S_3$) Empty Seat;
($S_4$) Rear Facing Infant Seat with Blanket (RFIS/b);
($S_5$) Person Seated Normally (PSN);
($S_6$) Person Reading Newspaper (PRN); and
($S_7$) Person Holding Object (PHO);

All of these scenarios are assigned a priori probabilities $Pr(S_i)$. In the case of the second embodiment, the probability distributions defined for the above five measures given these eight scenario, i.e., $f_x(M_j)\ S_i$, thus making a total of 40 distributions. As the processor calculates the five measures, the probability of a particular measure given a particular scenario (i.e., $Pr(M_j\ S_i)$) is calculated using the available distributions. The probability of the five measures, given a particular scenario, is calculated as follows:

$$Pr(M_0, M_1, M_2, M_3, M_4 \mid S_i) = \prod_{j=0}^{4} Pr(M_j \mid S_i) W_{ji} + \sum_{j=0}^{3}\sum_{k=1}^{4} Pr(M_j \mid S_i) Pr(M_k \mid S_i) Pr(S_i)\{C_{jkK_i}\}$$

$$j \ne k, k > j$$

where, $W_{ji}$ and $C_{jkK^i}$ are the autocorrelation and cross-correlation terms respectively. The correlation matrix $(I_i)$ for each scenario for the five measures is:

$$I_i = \begin{bmatrix} W_{0i} & C_{01K_i} & C_{02K_i} & C_{03K_i} & C_{04K_i} \\ C_{10K_i} & W_{1i} & C_{12K_i} & C_{13K_i} & C_{14K_i} \\ C_{20K_i} & C_{21K_i} & W_{2i} & C_{23K_i} & C_{24K_i} \\ C_{30K_i} & C_{31K_i} & C_{32K_i} & W_{3i} & C_{34K_i} \\ C_{40K_i} & C_{41K_i} & C_{42K_i} & C_{43K_i} & W_{4i} \end{bmatrix} \quad (i = 0...7)$$

If is assumed that there is very little correlation between the measures, therefore the crosscorrelation terms are taken to be zero. The autocorrelation terms being one, the above equation then simplifies down to:

$$Pr(M_0, M_1, M_2, M_3, M_4 \mid S_i) = \prod_{j=0}^{4} Pr(M_j \mid S_i)$$

Then, probability of a scenario can be calculated using the five measures and Baye's rule as follows:

$$Pr(S_i \mid M_0, M_1, M_2, M_3, M_4) = \frac{Pr(M_0, M_1, M_2, M_3, M_4 \mid S_i) Pr(S_i)}{\sum_{k=0}^{7} Pr(M_0, M_1, M_2, M_3, M_4 \mid S_k) Pr(S_k)}$$

This provides eight probabilities, i.e. probabilities of the eight scenarios, given the five measures, $Pr(S_i|M_0,M_1,M_2,M_3,M_4,M_5)$ e. The airbag inflator is then enabled, controlled, or disabled depending on what the most probable scenario warrants.

Accordingly, one object of the instant invention is to provide an improved vehicle occupant discrimination system that can distinguish various seat occupancy scenerios.

A further object of the instant invention is to provide an improved vehicle occupant discrimination system that can be used to affect the control of a safety restraint system so as to reduce the risk of injury to occupants in the event of a crash or the deployment of the safety restraint system.

These and other objects, features, and advantages of the instant invention will be more fully understood after reading the following detailed description of the preferred embodiment with reference to the accompanying drawings and viewed in accordance with the appended claims.

BRIEF DESCRIPTION OF THE DRAWINGS

FIGS. 2a, 2b and 2c are schematic illustrations of an embodiment for detecting the occupant position.

FIG. 3 illustrates a block diagram of the hardware incorporated in various embodiments of the instant invention.

FIG. 11 illustrates a block diagram of a subprocess for calculating secondary measurements, in accordance with the process of FIGS. 4a, and 4b.

FIG. 13 illustrates a block diagram of a subprocess to check if the seat occupancy scenario is settled, in accordance with the process of FIGS. 4a, and 4b.

DETAILED DESCRIPTION OF THE PREFERRED EMBODIMENT(S)

Figure 1:
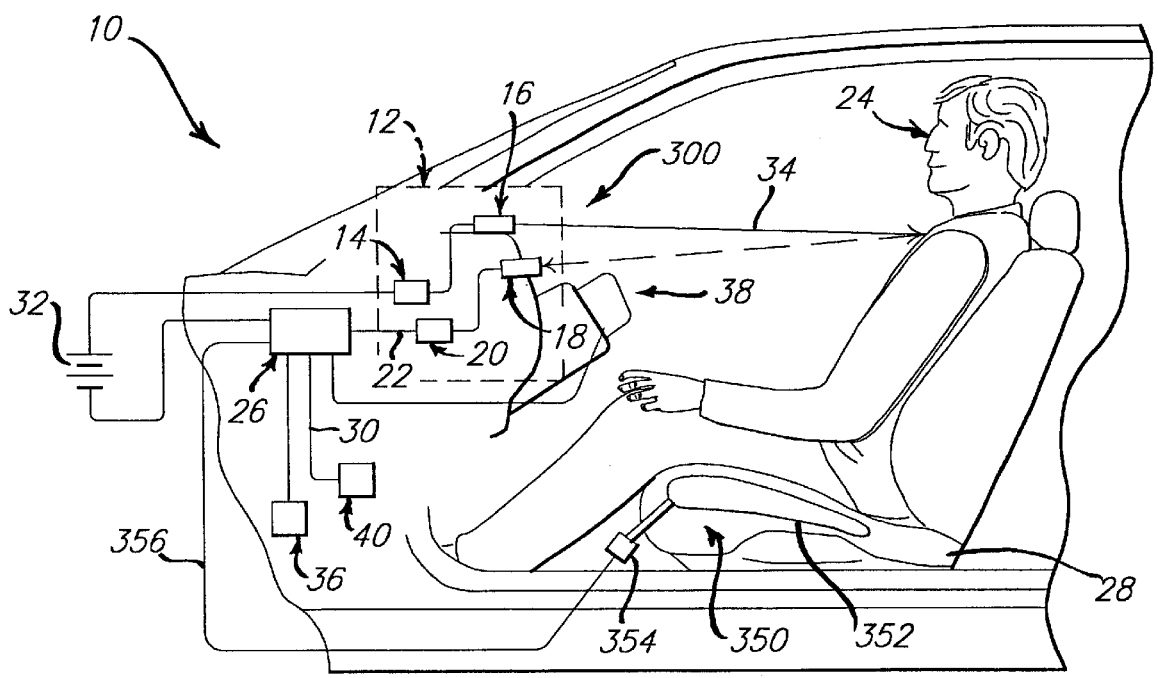
FIG. 1 is a schematic illustration of vehicle occupant discrimination system having an occupant position detector and a weight sensor in accordance with the present invention

Referring to FIG. 1, a vehicle occupant discrimination system 10 in accordance with the instant invention senses and discriminates the condition of seat occupancy by an object on a vehicle seat for controlling the activation of a safety restraint system, such as an air bag inflator 38 or for activating a warning device 40. More particularly, the vehicle occupant discrimination system 10 comprises a position sensor 300 and a seat weight sensor 350. The position sensor 300 measures the distance of an object in the vehicle seat relative to the fixed structure within the vehicle and generates transitory values for occupant position therefrom. The weight sensor 350 generates a weight output 356 responsive to the weight of an occupant 24 or object on the vehicle seat 28.

In one embodiment of the instant invention as illustrated in FIG. 1, the weight sensor 350 comprises a fluid filled bladder 352 together with a pressure transducer 354 for measuring the pressure therewithin. However, the instant invention is not limited to any particular design or configuration of the associated weight sensor 350 in the seat so long as the particular weight sensor 350 provides a measure of the weight of the occupant 24 or object on the vehicle seat 28.

In one embodiment of the instant invention, the position sensor 300 comprises active infrared position detector 12 comprising the following: a modulator 14 connected to an optical transmitter 16, and an optical receiver 18 connected to a synchronous demodulator 20. The synchronous demodulator 20 generates a range output 22 indicative of the distance between an occupant 24 and a potential impact point within the vehicle. The range output 22 is supplied to a signal processor/discrimination unit 26 for storage in a memory 36, and for subsequent use as a basis for selecting the temporally most appropriate or "optimal" one of a plurality of predetermined crash discrimination strategies. The active infrared position detector 12 and the signal processor/discrimination unit 26 receive power from a vehicle battery 32.

In operation, a narrow infrared beam 34 is directed horizontally at the expected position of the driver or passenger. At least a portion of the light energy scattered by the occupant's clothing is detected by the optical receiver 18, which is located away from the beam axis so that the optical receiver 18 can detect differences in reflected light intensity and angle associated with occupant absence, presence and forward motion. The infrared beam 34 is distinguished from ambient light of the same wavelength by modulating the intensity thereof. A modulation frequency of about 10 Khz or higher provides acceptable modulation since a minimum of 10 Khz is well within the range of most existing electronic and optical systems, and is fast enough to monitor passenger movement in real time. Determination of the instantaneous distance of the occupant from the optical transmitter 16 is based on the relative intensity of the light scattered by the occupant as measured by a detector or detectors, with measurements based on relative intensity or the angle from which the light is received.

Figure 2B:
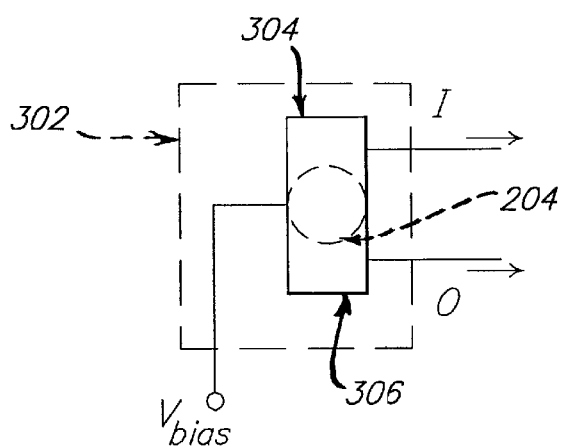

Referring to FIGS. 2a–c, the infrared beam 34 is generated by an infrared light emitting diode or semiconductor laser 116 located within the optical transmitter 16 and is collimated by a lens 118 to produce an infrared beam 34 that maintains a constant diameter of approximately one inch over a distance of 6 to 30 inches. The collimated infrared beam 34 is then scattered in all directions by a reflecting surface 120, i.e. the vehicle occupant 24 if present. The distance detected by the active infrared position detector 12 is based upon triangulation of the received light intensity. The scattered collimated infrared beam 34 is focused by an imaging lens 202 to form a relatively small spot 204 on a position sensitive detector (PSD) 302. Since the imaging lens aperture selects the fraction of the scattered light that reaches the position sensitive detector (PSD) 302, the spot 204 on the detector moves when the angle α between the axis of the infrared beam 34 and the axis of the reflectively scattered light reaching the detector changes, as shown in FIG. 2c.

The PSD 302, as shown in FIG. 2b, is a distributed photosensitive device for which the contrast ratio $(I_1-I_2)/(I_1+I_2)$ in output currents I and O from the inside and outside ends 304 and 306 respectively provides a linear measure of the spot's vertical position. As shown in FIG. 2c, when the angle α varies, the position at which the reflected light is imaged will vary across the PSD 302. The ratio of the two current outputs I and O varies as the center of light intensity moves across the PSD 302 and, therefore, provides a measure of the angle α.

The direction of the reflected rays reaching the PSD 302 is determined by the positions of the center of the imaging lens 202 and the point where the reflecting surface 120 cuts the infrared beam 34. Thus, the particular angle α at which light is received at the PSD 302 depends only on the distance x to the reflecting surface. This angle is determined by tan α=b/x, where x is the distance from the source to the reflecting surface, and b is a predetermined lateral separation of the transmitter and the detector. As the angle α varies, the relative amounts of current I and O is proportional to the location of the spot 204. Signal processing of the detector output currents preferably includes the step of calculating the amplitude-independent ratio of currents to correct for reflection variation at the reflecting surface 120. The ratio of the relative intensities determines the location of the spot 204 to provide a good measure of the angle α and, hence, of the distance x to the reflecting surface 120.

Alternately, other types of position sensors may be incorporated in the instant invention instead of the active infrared position detector 12 illustrated in FIGS. 1 and 2a–c. For example, any type of non-contacting position sensor that measures position by triangulation, imaging, or temporal ranging could be incorporated as the position sensor 300 of the instant invention. Moreover, the position sensor 300 is not limited by the frequency or mode of operation, and accordingly may incorporate optical, electromagnetic or ultrasonic signals. More particularly, the position sensor 300 may comprise a radar or an ultrasonic ranging sensor. However, in the preferred mode of operation, the instant invention incorporates a position sensor 300 in accordance with the teachings of U.S. Pat. Nos. 5,446,661 or 5,490,069, which are incorporated herein by reference.

First Embodiment

Overview:

Referring to FIG. 3, in accordance with a first embodiment of the instant invention, the algorithm incorporated therein uses information obtained from a collimated, modulated, optical beam that is reflected from a surface and imaged by a lens on a position sensitive detector (PSD) 302. The algorithm also uses information from a seat weight sensor, a speed sensor, and a door switch. The position of the imaged light on the PSD 302 allows the algorithm to compute the distance to the reflecting surface. The algorithm bases its assessment by keeping track of the distance, patterns of motion and weight over time and builds up confidence as time progresses. That is, as the scenario gets 'older', the algorithm gets more and more confident about its assessment. The algorithm uses signals from the optical sensor which are:

1. Inside channel signal (I): It is the signal from the inside end of the PSD 302. The signal level gets higher as the distance to the target gets higher.
2. Outside channel signal (O): It is the signal from the outside end of the PSD 302. The signal level gets lower as the distance to the target gets higher.
3. Led signal: This is the value of the driving voltage of the LED 116.
4. Limit detector signal: This signal from the range limit detector 140 becomes high when the target is closer than a threshold.

Besides the optical signal, the algorithm receives weight information from the weight sensor 350 and speed information from the speed sensor 50. The door switch 60 is used for instantaneous recognition of new scenarios.

The algorithm calculates four measures from the input signals. These measures are reset at the onset of a new scenario and therefore the recognition of a new scenario is a key factor. Based on these measures the algorithm determines whether the scenario is a Rear facing infant seat (RFIS) or an empty seat or a person. The airbag is then enabled or disabled depending on what the most probable scenario warrants.

Algorithm:

The algorithm is best understood with reference to FIGS. 4a through 16c. Table 1 lists the pertinent parameters of the algorithm, and their associated nominal values, for parameters referenced herein. In general, the names of parameters are capitalized, whereas the names of variables are written in lower case.

Figure 4A:
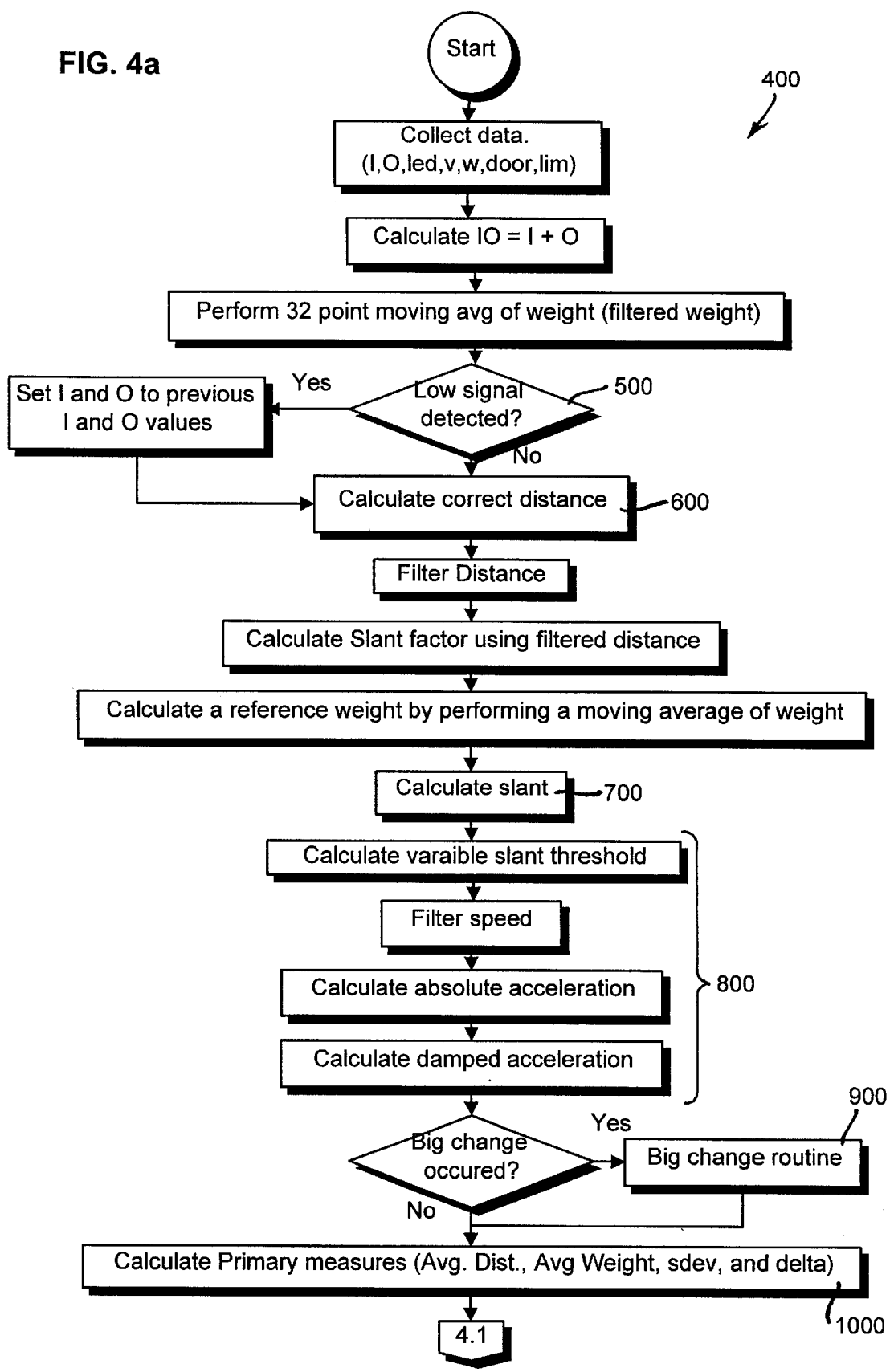
FIGS. 4a, and 4b illustrates an overall block diagram of a signal processing algorithm in accordance with a first embodiment of the instant invention.
Figure 4B:
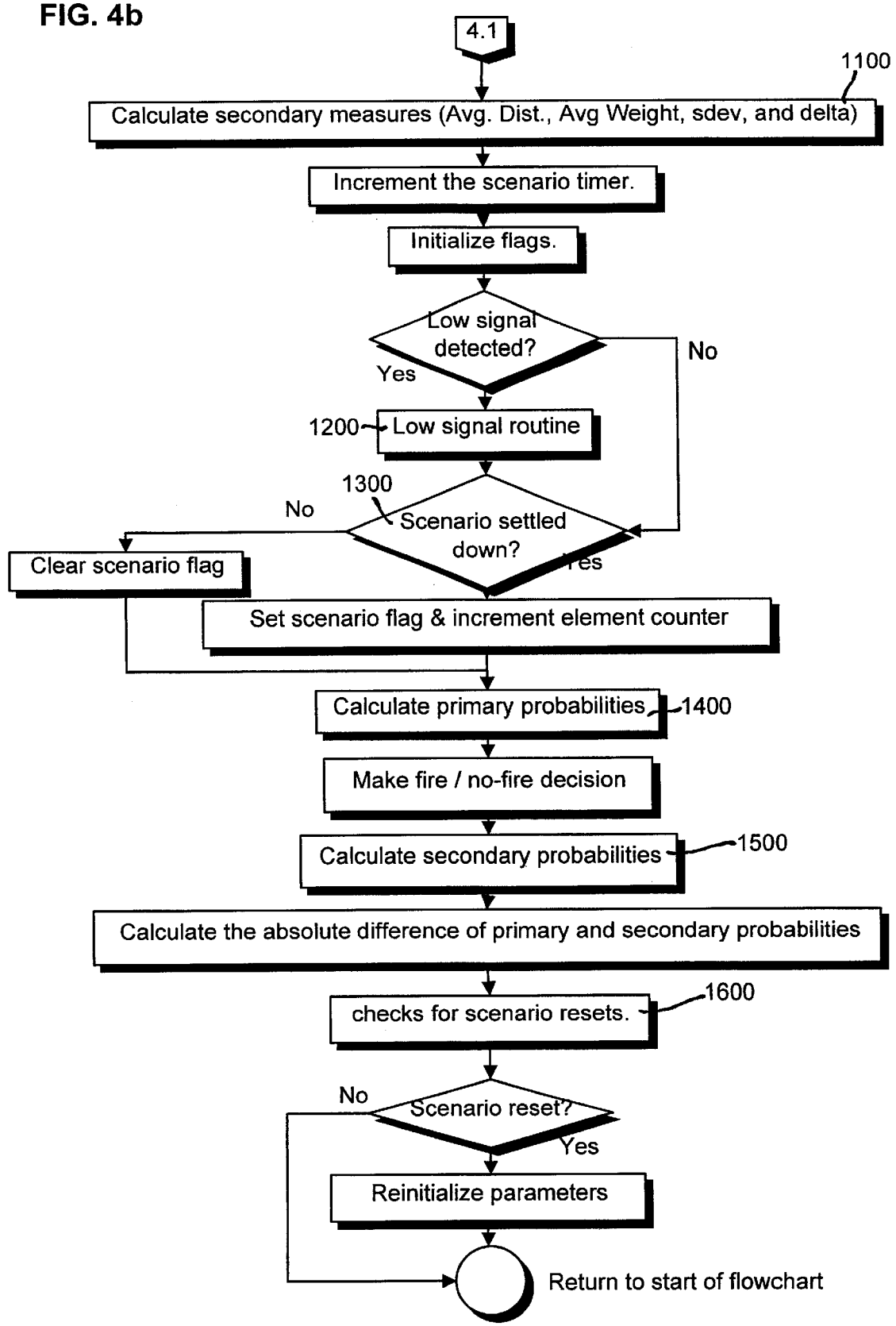
Figure 5:
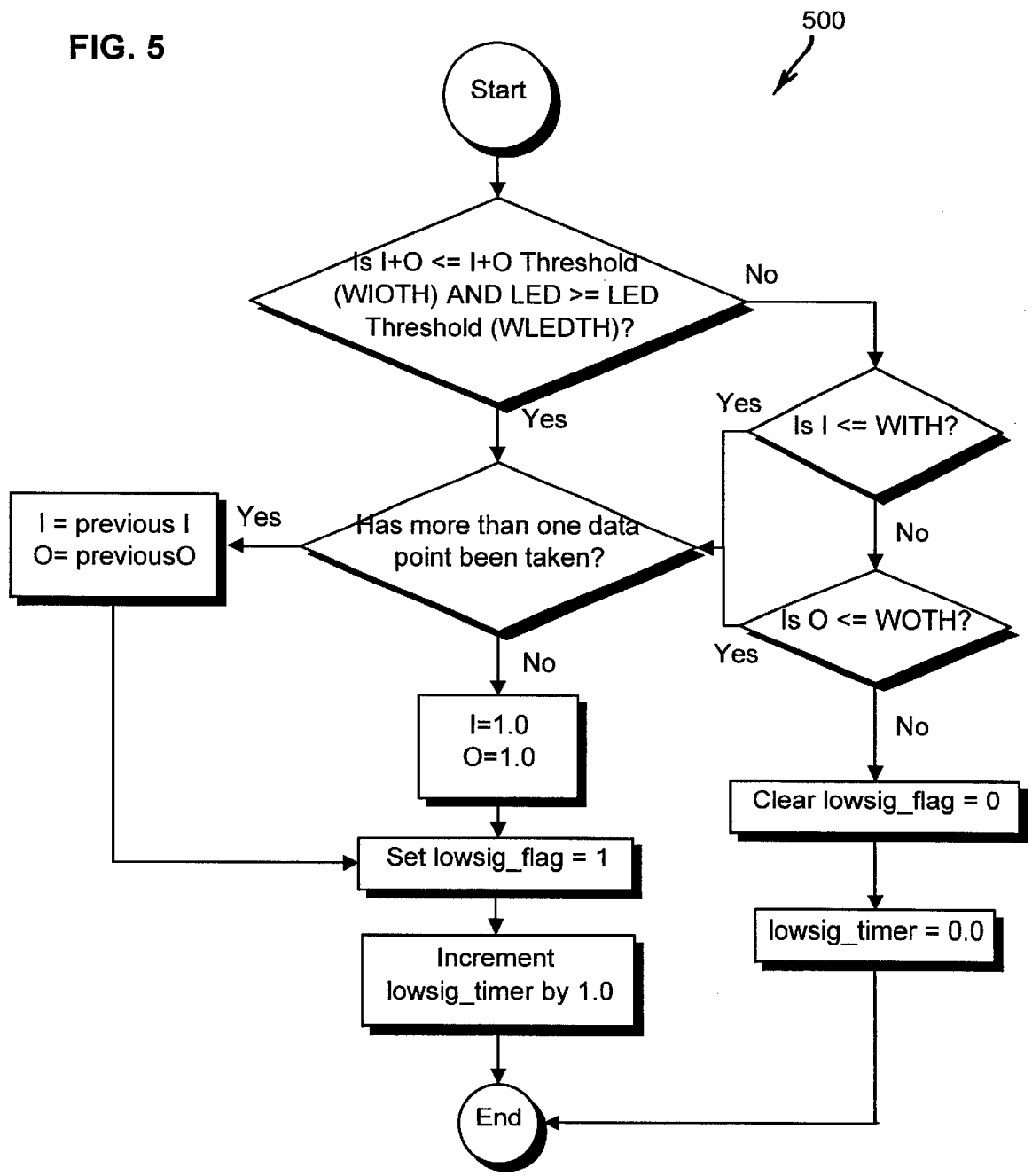
FIG. 5 illustrates a block diagram of a subprocess for detecting if the signal from the position sensor has a low level, in accordance with the process of FIGS. 4a, and 4b.

The overall occupant discrimination algorithm 400 in accordance with the instant invention is illustrated in the block diagram of FIGS. 4a and 4b, which includes the illustration of various subprocesses as single blocks therein. More particularly, the occupant discrimination algorithm 400 incorporates subprocesses 400, 500, 600, 700, 800, 900, 1000, 1100, 1200, 1300, 1400, 1500, and 1600, which are illustrated in greater detail in respective FIGS. 5 through 16c. The occupant discrimination algorithm 400 is described hereinbelow with respect to the respective subprocesses.

TABLE 1

| Parameter | Description |
| --- | --- |
| a,b,c | Calibration constants of the active infrared position detector |
| ACCDLT | Damp factor for calculating accacc which in turn is used to calculate the damped acceleration, effmot. Nominal value is 0.9914. |
| DCTIM | If quicktim is greater than this value (seconds) then the scenario flag is set to 1. |
| EFFTHR | The threshold to which effmot is compared. If effmot is above this threshold then that indicates high acceleration or deceleration and slant and variance calculations are halted. The nominal value is 6. This is based on taking a 6 mph change in 6 seconds as the tolerance. |
| ELTHR | If element counter (elcnt) is greater than this threshold (seconds) then p1 and n1 are updated. Nominal value is 9 seconds. |
| FUZTIM | When the scenario timer is greater than this value (in seconds), the probability measure for delta and variance is initiated. Nominal value is 9 (seconds). |
| LMBS | The airbag is disabled if the probability of disable is greater than this threshold. Nominal value is 0.5. |
| LSGTTHR | When the low signal timer (lowsig_timer, which counts for how long the algorithm has been in the lowsignal mode) exceeds this value (in seconds) the scenario is reset. Nominal value is 45 (seconds). |
| MACCN | Window size (in seconds) to calculate the moving sum of the absolute acceleration. Nominal value is 30 (seconds). |
| MAXA | Maximum possible distance (cms). Nominal value is 120 cms. |
| MAXACC | Maximum acceleration tolerated. The absolute value of acceleration/deceleration is clipped to this value. The nominal value is 0.5 g. This value of 0.5 g converted to mph per 50 millisecond is 0.559, where it is calculated using 0.5 g = (500*3600)/(3*1760*30.48*20) = 0.559 |
| MAXRET | The value (in seconds)from which the low_return_timer (the timer which starts counting down to zero once the algorithm comes out of the low signal mode) starts counting from. Nominal value is 15 seconds. |
| MINDIS | Minimum distance when limit detector is on (cms). Nominal value is 5 cms. |
| RESET_SPEED_THRESHOLD | If the speed is above this threshold (mph) then some of the reset parameters are changed so as to make the reset of a scenario more 'difficult'. Nominal value is 0 (mph). |
| SCTIM | When the scenario timer (scentim) is greater than this value (seconds) the scenario flag is set to 1. Nominal value is 45 seconds. |
| SDEV_CLIP | Maximum value to which the variance measure is clipped. Nominal value is 0.03. |
| SLCLIP | Maximum value of the variable slant threshold. Nominal value is 10500. |
| SLFAC | Used for calculating slant_factor. Nominal value is 0.7. |
| SPDVIB | incremental factor which linearly increase the overall slant threshold with respect to speed, to account for vibration induced through the motion of the vehicle. |
| THRCNT | Slant threshold at zero speed. Nominal value is 2857. |
| WGTDIS | Range threshold (cms) used in the weight reset routine when the vehicle is stationary. Nominal value is 8 cms. |
| WGTDIS_2 | Threshold for the moving average of the absolute difference of primary and secondary animacy probabilities above which scenario is reset. This threshold is used when the vehicle is in motion. Nominal value is 0.9. |
| WGTTHR | Weight threshold (lbs) used in the weight reset routine when the vehicle is |

TABLE 1-continued

| Parameter | Description |
|---|---|
| | stationary. Nominal value is 34 lbs. |
| WGTTHR_2 | Weight threshold (lbs) used in the weight reset routine when the vehicle is in motion. Nominal value is 34 lbs. |
| WIOTH | The sum of the inside and outside psd channel signals (IO) have to be below this threshold to enter the low signal mode. Nominal value is 0.7 volts. |
| WITH | The inside psd channel (I) has to be less than this threshold to enter the low signal mode. |
| WLEDTH | The led signal has to be greater than this threshold (in counts) to enter the low signal mode. The nominal value is 4094 (corresponding to FFE hex) |
| WLSGTM | If the algorithm has been in the low signal mode for longer than this period (in seconds), but the algorithm has NOT been in the low signal mode for longer that LSGTTHR, then the algorithm starts using only weight. Nominal value is 30 seconds. |
| WOTH | The outside psd channel (O) has to be less than this threshold to enter the low signal mode. |
| WSCENTM | If the algorithm has been in the lowsignal mode and the scenario timer is lower than this value (in seconds) than only the weight measure is used. Nominal value is 128 seconds. |
| X0 | Mean (cms) of the first Gaussian range density function of RFIS. |
| X1 | Mean (cms) of the second Gaussian range density function of RFIS. |
| X2 | Mean (cms) of the first Gaussian range density function of person. |
| X3 | Mean (cms) of the second Gaussian range density function of person. |
| X4 | Mean (cms) of the first Gaussian range density function of empty seat. |
| X5 | Mean (cms) of the second Gaussian range density function of empty seat. |

Figure 6:
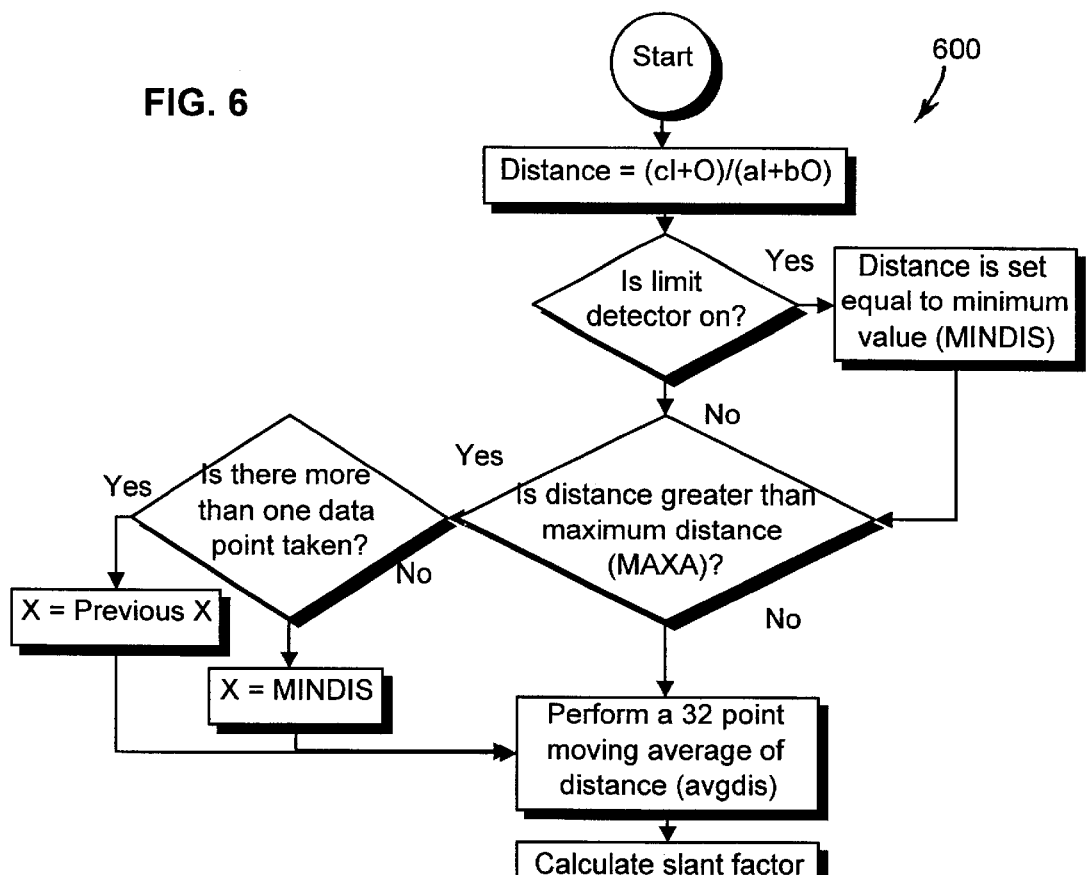
FIG. 6 illustrates a block diagram of a subprocess for calculating the distance to an occupant or object on the seat of a vehicle, in accordance with the process of FIGS. 4a, and 4b.

Distance:

The signal processor/discrimination unit 26 of the instant invention samples data such as at 2 Khz, which samples are integrated to lowpass filter the data and down sample to 20 hz. Such a sample rate is high enough to detect even the fastest human motion. Referring to FIG. 6 illustrating subprocess 600, the I and O signals are used to calculate the distance using the formula:

$$X(i)=(c \cdot I+O)/(a \cdot I+b))$$

where a, b, and c are calibration constants specific to each optical sensor unit. If a limit detector is on, i.e., if a limit detector signal exceeds a certain threshold denoting a target within close proximity, then a default distance is set to a minimum value (MINDIS). If the calculated distance exceeds a maximum value (MAXA), then the distance is set to this maximum value. A 32 point moving average of the distance is calculated (avgdis).

Figure 7:
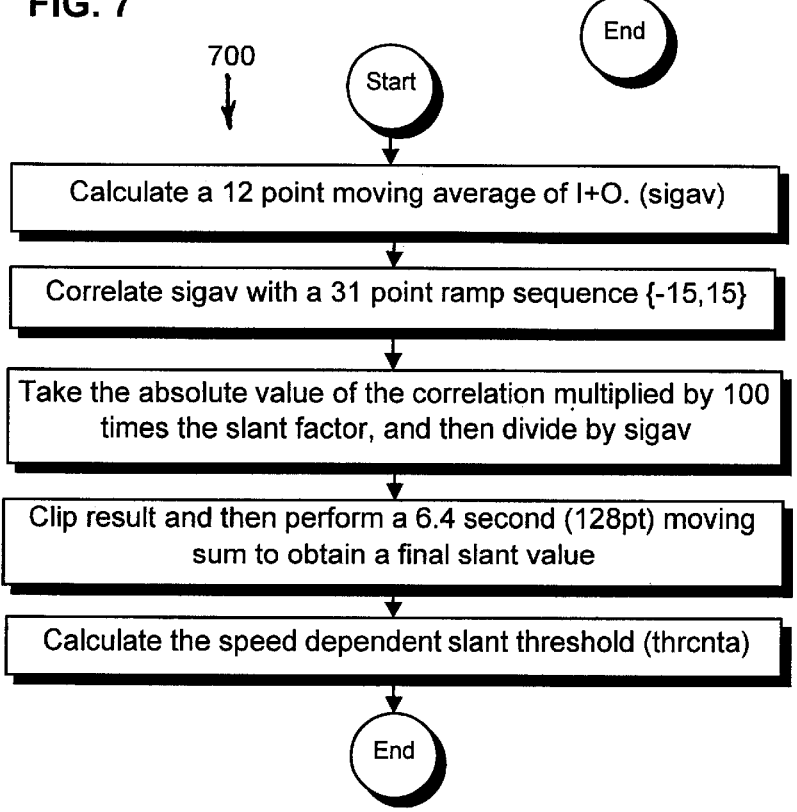
FIG. 7 illustrates a block diagram of a subprocess for calculating the slant component in the measurement of distance to the occupant or object on the seat of a vehicle, in accordance with the process of FIGS. 4a, and 4b.

Slant:

Referring to FIG. 7 illustrating subprocess 700, the slant processing subprocess is used for the detection of small amplitude motion. Small amplitude human motions such as breathing are very hard to recognize from changes in the distance measures because of the noise in the distance signal. To identify these motions the algorithm looks at the variations in the total returned signal, I+O=IO. The addition of I and O cancels the thermal PSD noise, since that noise is antisymmetric. A 12 point moving average of IO is done to get sigav. This is used to calculate a 1.5 second slant transform. At 20 hz this is a correlation of the sigav sequence with a 31 point sequence {-15 ... 15}. This slant value is normalized by sigav to get the percent variation. The absolute value of the normalized factor is then multiplied by a distance factor (slant_factor) to get a result which corresponds to motion. The slantfactor is calculated as follows:

$$\text{slant\_factor}=\{(\text{avgdis}-50)*\text{SLFAC}+50\}/50,$$

Where SLFAC is a number between 0 and 1. A typical value is 0.7. A SLFAC value of 1 would correspond to a linear distance multiplier. Because non-PSD noise tends to increase somewhat with distance, a SLFAC of less than 1 is preferably used, which gives a weaker than linear multiplication and some suppression of the non PSD noise. This final result is clipped and finally a 6.4 second moving average is performed. This is the final slant value (slantav). This slantav is compared to a speed dependent threshold (thrcnta), where the threshold is calculated as follows:

$$\text{thrcnta}=\min[\text{SLCLIP},(\text{THRCNT}+\text{SPDVIB}*\text{speed})]$$

where, THRCNT is the base slant threshold (at 0 speed) and SLCLIP is the maximum allowable slant value which is usually the value at approximately 60 miles per hour. SPDVIB is the incremental factor which linearly increases the overall slant threshold (thrcnta) from a value of THRCNT at zero velocity to SLCLIP at its specified speed. This is to take into account the vibration induced through the motion of the vehicle. If slantav is above thrcnta it denotes motion thus indicating the presence of a person. If slantav is below the threshold that indicates inanimacy, therefore indicating the presence of either a RFIS or an empty seat.

Figure 8:
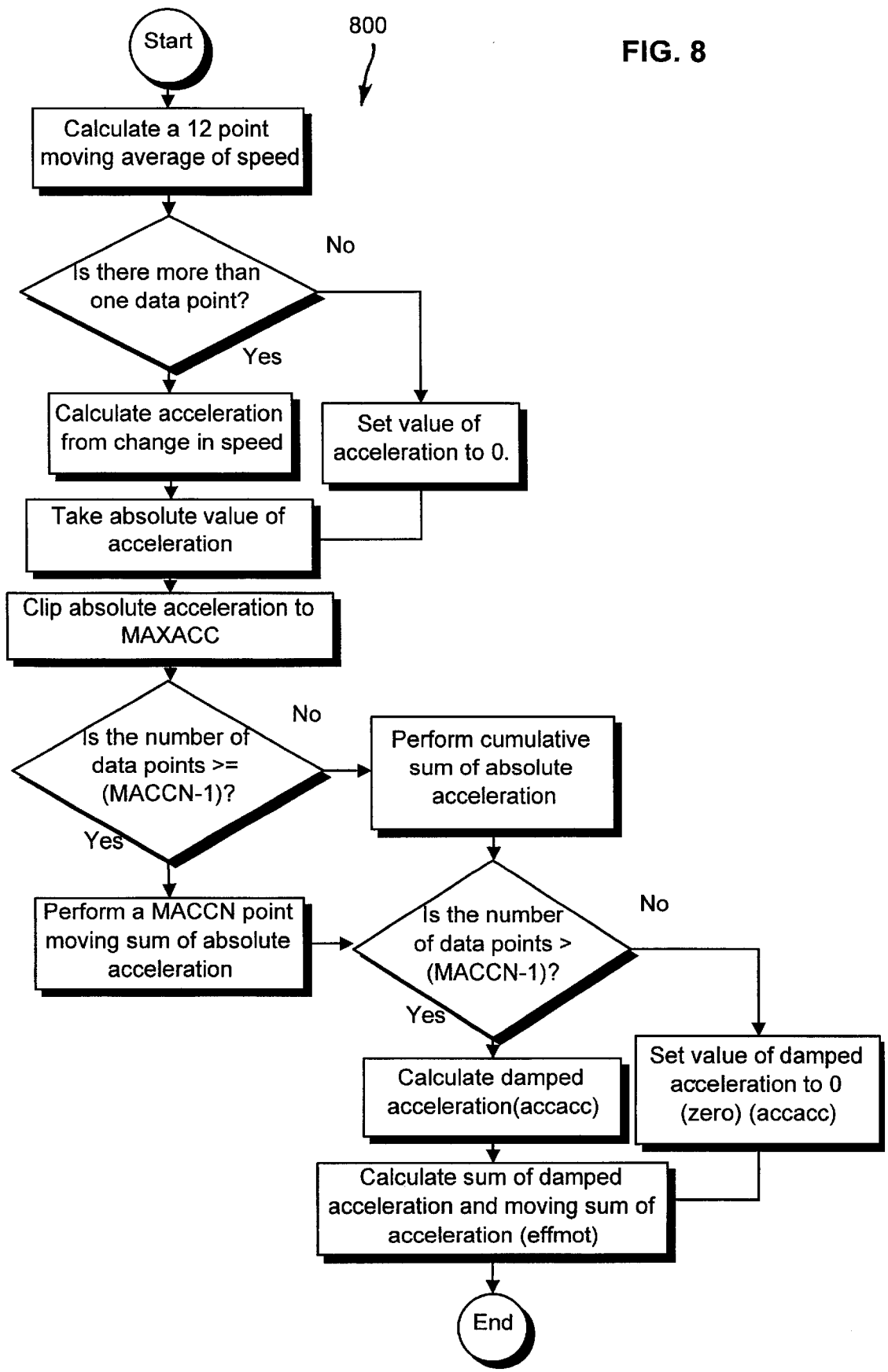
FIG. 8 illustrates a block diagram of a subprocess for filtering vehicle speed and calculating and filtering acceleration from the vehicle speed signal, in accordance with the process of FIGS. 4a, and 4b.

Speed and damped acceleration:

Referring to FIG. 8 illustrating subprocess 800, at first a 12 point moving average of the speed signal is taken. Acceleration is calculated from the filtered speed signal by taking the difference between consecutive samples. The absolute value of the acceleration signal is taken and clipped to a maximum tolerable acceleration (MAXACC) to obtain absacc. A moving sum of the absolute acceleration (absacc) is calculated (accsum). The window length is MACCN. Any older value outside the window is damped and added to the moving sum to obtain effmot. The damp factor is ACCDLT. Therefore effmot is:

$$effmot(n) = \sum_{i=n-MACCN+1}^{n} absacc(i) +$$

-continued $$\sum_{j=1}^{n-MACCN} (ACCDLT)^j absacc(n - MACCN + 1 - j)$$

Effmot is used as an indicator of high acceleration and deceleration. If it exceeds a threshold (EFFTHR) then the motion measures are disregarded.

Figure 9:
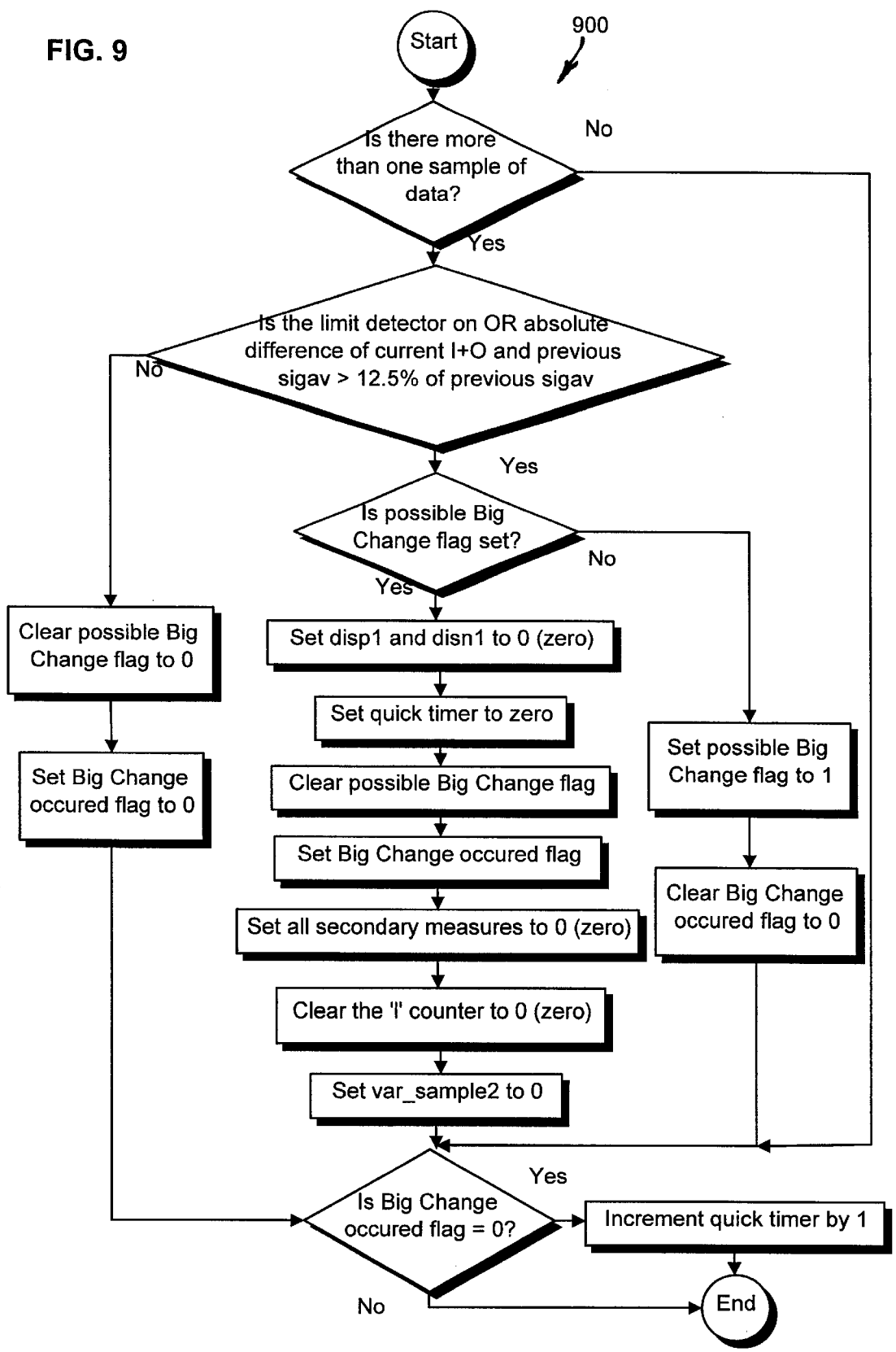
FIG. 9 illustrates a block diagram of a subprocess for detecting big changes in the distance measurement, in accordance with the process of FIGS. 4a, and 4b.

Big change:

Referring to FIG. 9 illustrating subprocess 900, when two consecutive I+O signal samples go through a big change [i.e. the absolute difference between IO (n) and sigav(n−1) is greater than 12.5% of sigav(n−1) for two consecutive samples] and/or the limit detector stays on for two consecutive samples then a 'big change' is said to have taken place. A timer (quicktim) starts timing at this point. This timer tells when the last 'big change' occurred.

Figure 10:
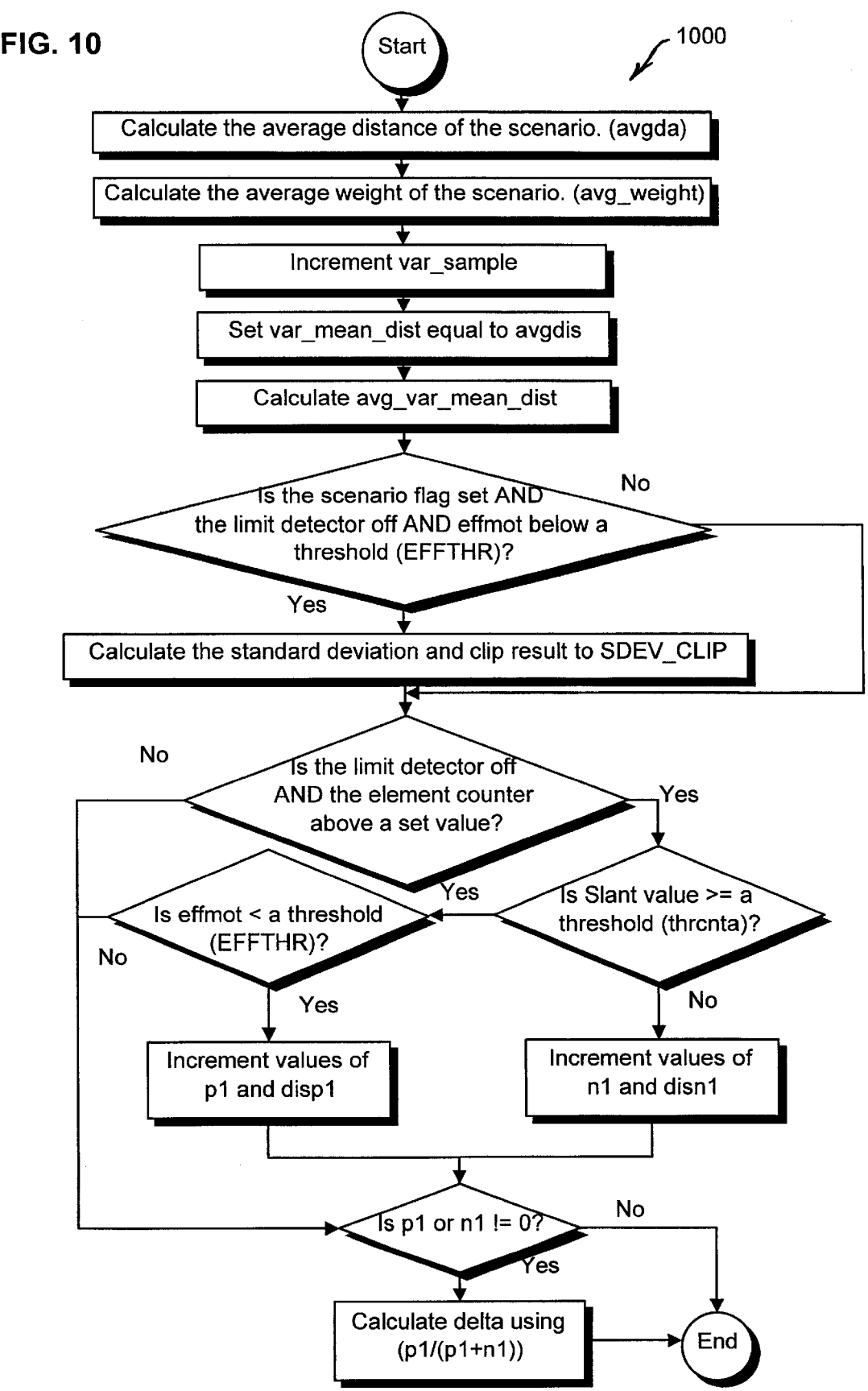
FIG. 10 illustrates a block diagram of a subprocess for calculating primary measurements, in accordance with the process of FIGS. 4a, and 4b.

Algorithm measures:

Referring to FIGS. 10 and 11 illustrating subprocesses 1000 and 1100, which respectively calculate primary and secondary measures, the algorithm calculates four measures from the optical and weight signals. The measures are 1. Mean distance ($\bar{x}$)
2. Variance of the distance($\sigma^2$)
3. Mean weight ($\bar{w}$)
4. Slant measure ($\delta$)

Two sets of measures are calculated. One is called the 'primary' measures which are calculated from the beginning of the scenario and is reset at the onset of a new scenario. The other is the 'secondary' measures which are calculated from the onset of a 'big change' and are reset at the onset of the next 'big change'.

Mean distance($\bar{x}$):

This is the mean of the distance of the scenario calculated from the very beginning of the scenario, i.e.

$$\bar{x}(n) = \frac{1}{n}\sum_{i=1}^{n} avgdis(i)$$

where, n is the total number of samples available since the beginning of the scenario.

Similarly, the secondary mean distance is calculated, where n is the number of samples from the last big change Variance of the distance ($\sigma^2$):

This is a measure of the large amplitude motion. Once the scenario 'settles down' (the scenario flag is set) and the limit detector is not on and there is no high acceleration or deceleration present (effinot<EFFTHR) a running variance of the distance is calculated. The distance is compared to a moving average distance ($\bar{X}_v$) as opposed to the mean distance till the present instant. The variance is not updated when effmot>EFFTHR or if the limit detector turns on because in these cases the signal level would show variance which are not induced by the actual motion of the target, but due to the vehicle acceleration/deceleration or the blocking of the optical sensor. The variance is calculated as:

$$\sigma^2(n) = \frac{1}{n}\sum_{i=1}^{n} \{avgdis(i) - \bar{X}_v(i)\}^2$$

The variance is clipped to a maximum value (SDEV_CLIP).

Similarly, the secondary variance is calculated, where n is the number of samples from the last big change.

Mean weight of the scenario:

The scenario mean weight is taken from the beginning of the scenario.

$$\bar{w}(n) = \frac{1}{n}\sum_{i=1}^{n} w(i)$$

The secondary average weight is calculated in a similar way, where n is the number of samples from the last big change.

Slant measure ($\delta$):

Two motion counters p1 and n1 are used to indicate animacy and inanimacy respectively. If the slant value (slantav) is above a threshold (thrcnta) then p1 is incremented, otherwise n1 is incremented. The counters p1 and n1 are reset at the onset of a new scenario. There are similar counters disp1 and disn1 which are analogous to p1 and n1 respectively. The only difference is that these are reset every time there is a big change. The counters p1 and n1 are not updated till the scenario flag has been set for a certain period. This is checked by seeing if elcnt is greater than ELTHR. This is to take into account the filter delays associated with the slant value. The second condition for not updating p1 and n1 is that if the limit detector is on. The p1 and disp1 counters are not updated in the presence of acceleration or deceleration. The final motion measure is $$\delta = p1/(p1+n1)$$

This is the primary motion measure. The secondary motion measure is:

$$\delta_2 = disp1/(disp1+disn1)$$

This measure has a range of from 0 to 1. The lower the value, the more it is indicative of an inanimate object (RFIS or empty seat).

Figure 12:
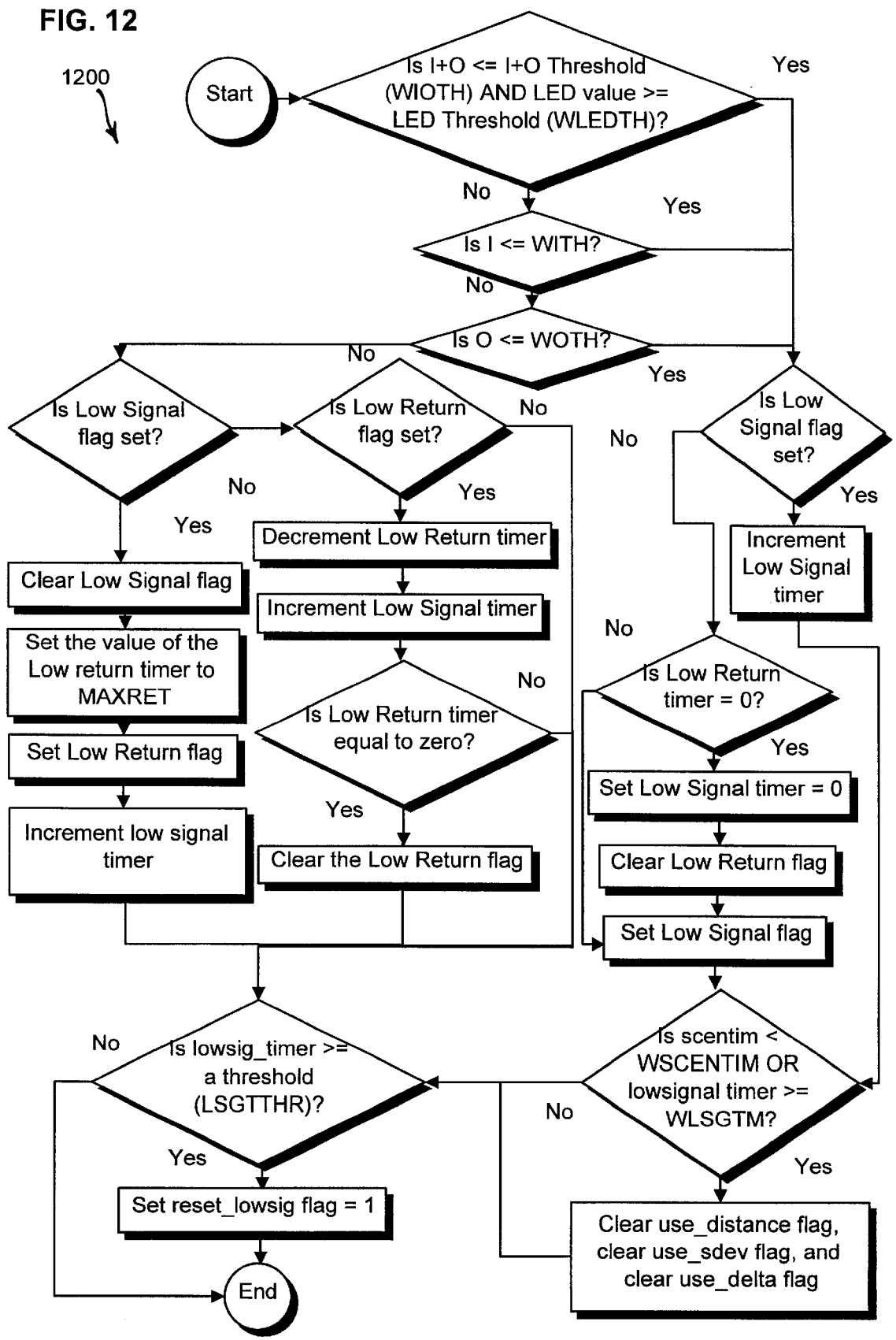
FIG. 12 illustrates a block diagram of a subprocess for handling low level signal conditions, in accordance with the process of FIGS. 4a, and 4b.

Low Signal Routine 1200:

Referring to FIG. 12 illustrating subprocess 1200, the algorithm enters a low signal mode if any one or more of the following three occur:

1) The inside channel (I) is below a threshold (WITH)
2) The outside channel (O) is below a threshold (WOTH)
3) The sum of the inside and outside channels (IO) is less than a threshold (WIOTH) and the LED signal is above a threshold (WLEDTH)

This could occur in the event of a very dark target (eg, black velvet). In this case the LED pumps up to almost its maximum value (if not its maximum value) and the returned signal has a low signal to noise ratio. The algorithm freezes off the I and O signals, i.e. disregards the current I and O signals. In other words:

$$I(n)=I(n-1)$$

$$O(n)=O(n-1)$$

At the same time a flag (lowsig_flag) is set to denote the presence of the low signal mode. A timer (lowsig_timer) starts timing at the same time to keep a track of how long the system has been in the low signal mode.

The algorithm constantly monitors to see if the optical sensor is blocked or the signal reflected off the target has a low signal to noise ratio. Once that happens, the algorithm 'recognizes' that and takes alternate routes and continues its assessment using the available useful signals. If the algorithm has been in the low signal mode for a long time then the algorithm reverts to using just weight. Till that happens, the algorithm still relies on its measures derived from the optical signals which are nothing but the last valid values saved prior to entering the low signal mode. This is done since the likelihood of the patterns changing during that time is low. If, however, the scenario is fairly new, then from the very onset of the low signal mode the algorithm uses just weight.

Once the algorithm comes out of the low signal mode, it does not start using the variance and delta measures right away. A timer (low_return_timer) starts timing out from a set value (MAXRET) and once it times out to zero the two motion measures are used. This is analogous to the startup condition. Till this timer times out to zero, the low signal timer continues to count on. If this counter exceeds a threshold (LSGTTHR) indicating that the algorithm has been in the low signal mode for a long enough duration to warrant gathering information afresh. The scenario is reset in this case.

Once the algorithm enters the low signal mode it freezes off the optical signal to the value prior to entering the low signal mode and uses this for a little while till that is rendered too old. On entering the low signal mode the algorithm disables the airbag in the event of an empty seat even if the requirement is to enable the airbag with an empty seat. This is done because the only useful information at this point is weight and the weight of a RFIS could be relatively light thereby resulting in the scenario of an empty seat that would otherwise cause the airbag to be enabled.

Scenario settling down:

Referring to FIG. 13 illustrating subprocess 1300, once a new scenario is recognized, then a flag (scenflg) is cleared. A timer (scentim) starts timing. Once the 'big change' timer (quicktim) counts up to a threshold (DCTIM) then the scenario flag is set. If the big change timer hasn't timed out to the threshold because of frequent big changes but the scenario timer has timed out to its threshold (SCTIM) then the scenario flag is set. At this point a counter (elcnt) starts counting. Thus the difference between this counter and scenario timer tells how long it took for the scenario to settle down. The scenario at this stage is said to have 'settled down'. This is done in order to disregard motion that may occur at the beginning of the scenario. For example, a RFIS may be put in the seat and the scenario change is recognized at that point. There will probably be motion as the RFIS is being positioned properly and then belted up. If this initial motion is considered then the motion measure for this scenario would indicate high motion and as the algorithm remembers what it sees for a long time, this high motion would have an effect for a long time. By letting the scenario 'settle down', the algorithm disregards all this initial motion.

Probability calculation

Figure 14A:
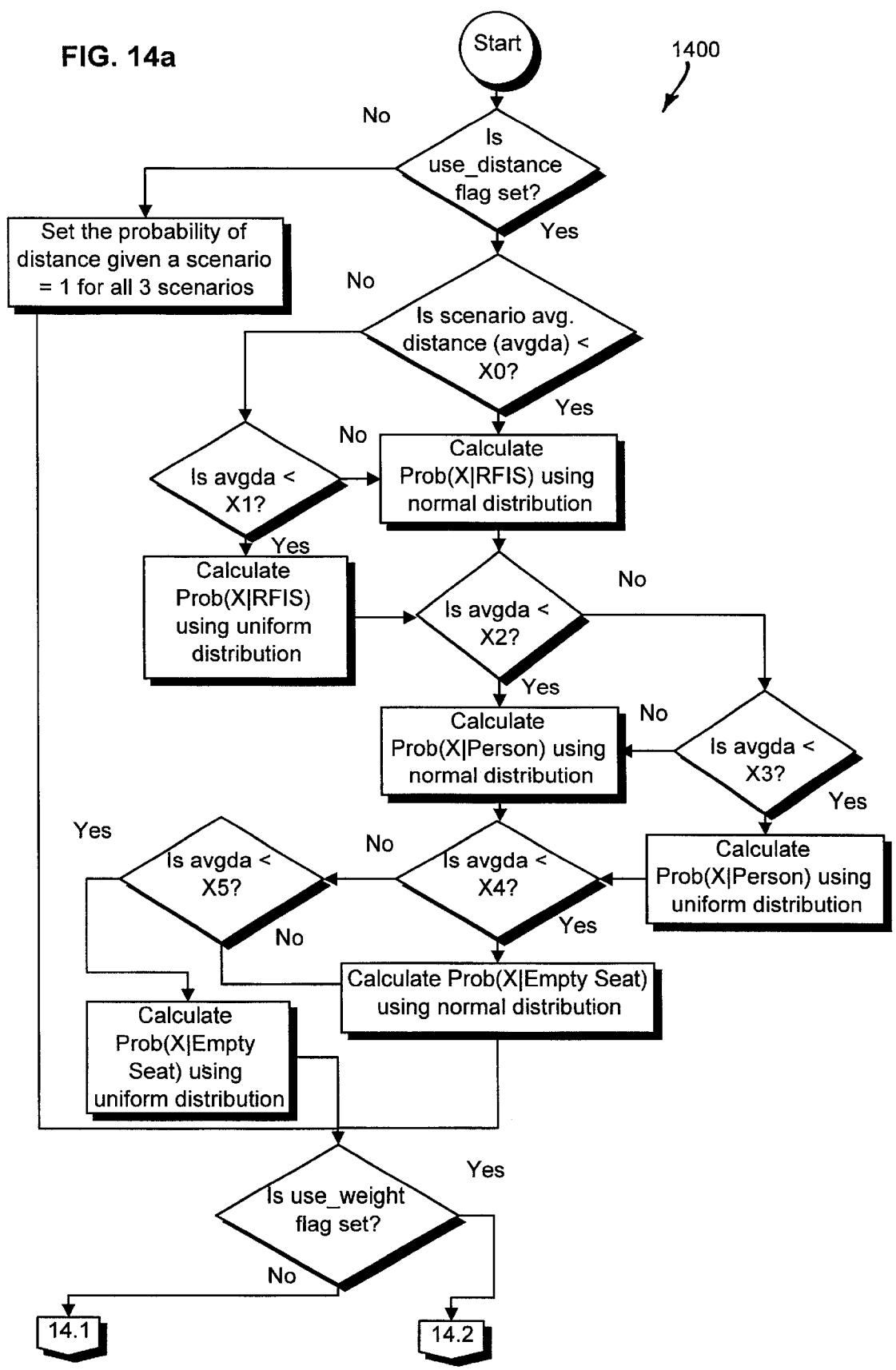
FIGS. 14a, 14b, and 14c illustrates a block diagram of a subprocess for making primary probability calculations, in accordance with the process of FIGS. 4a, and 4b.
Figure 14B:
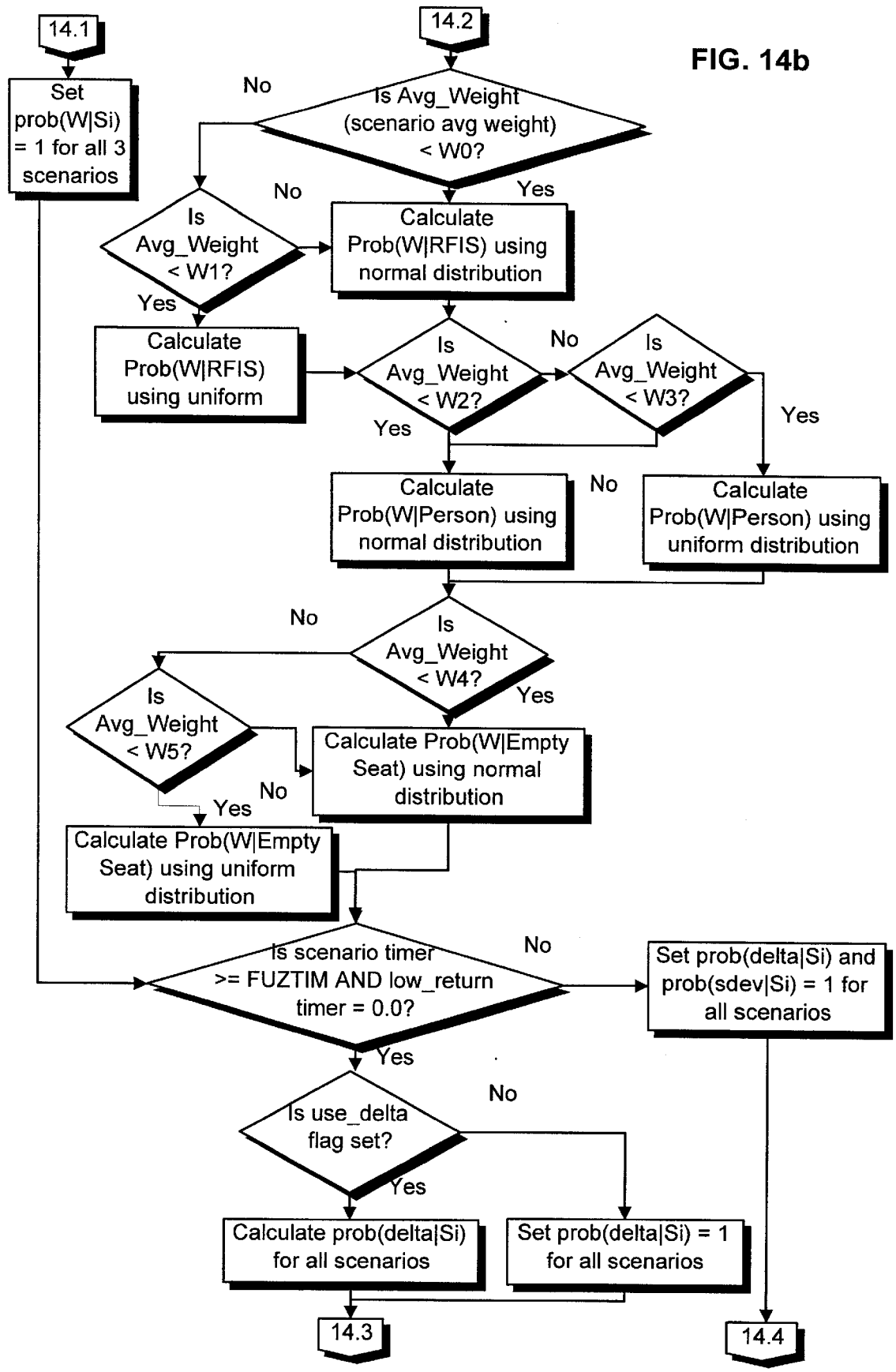
Figure 14C:
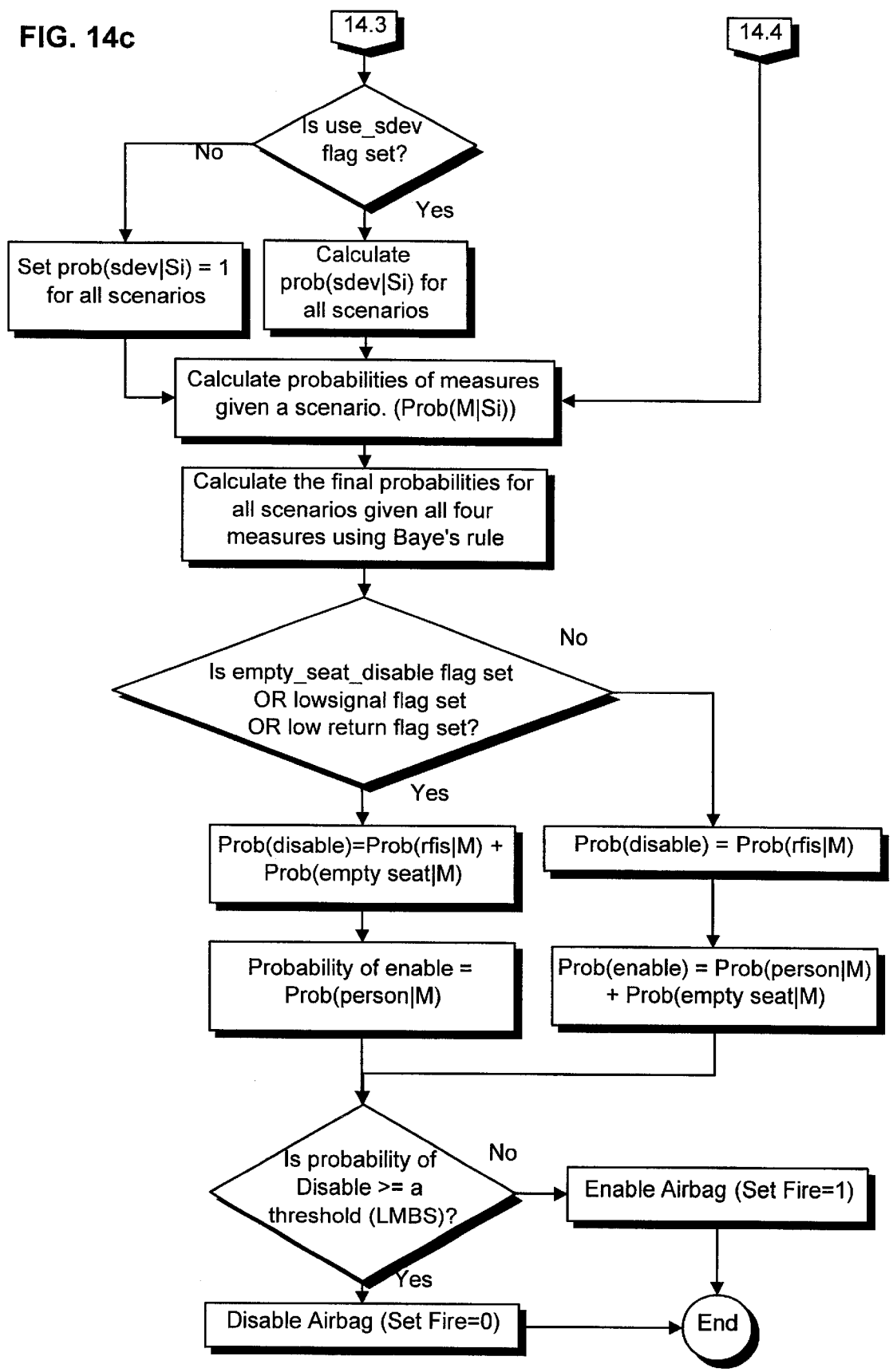

Referring to FIGS. 14*a*, 14*b*, and 14*c* illustrating subprocess 1400, the scenario sample space $\{S_i\}$ is divided into the following three categories:

(S0) Rear Facing Infant Seat (RFIS)

(S1) Empty Seat (ES)

(S2) Person (PSN)

All these scenarios are assigned a priori probabilities, $A(S_i)$, i.e. the a priori probabilities are:

Pr(RFIS)

Pr(ES)

Pr(PSN)

Probability density functions are defined for the above four measures given these three scenario:

$f_x(M_j|S_i)$ where $M_i = \{\bar{x}, \sigma^2, \bar{w}, \delta)\}$ and $S_i = \{RFIS, ES, PSN\}$ Accordingly, this provides a total of 12 distributions. As the algorithm calculates the four measures, the probability of a particular measure given a particular scenario [$Pr(M_j|S_i)$] is calculated using the available distributions. The probability of the four measures, given a particular scenario, is calculated as follows:

$$\Pr(M_0, M_1, M_2, M_3 | S_i) = \prod_{j=0}^{3} \Pr(M_j | S_i) W_{ji} +$$

$$\sum_{j=0}^{2} \sum_{k=1}^{3} \Pr(M_j | S_i) \Pr(M_k | S_i)$$

$$\Pr(S_i)\{C_{jkK_i}\} j \neq k, k > j$$

where, $W_{ji}$ and $C_{jkK^i}$ are the autocorrelation and cross-correlation terms respectively. The correlation matrix ($I_i$) for each scenario for the five measures is:

$$I_i = \begin{bmatrix} W_{0i} & C_{01K_i} & C_{02K_i} & C_{03K_i} \\ C_{10K_i} & W_{1i} & C_{12K_i} & C_{13K_i} \\ C_{20K_i} & C_{21K_i} & W_{2i} & C_{23K_i} \\ C_{30K_i} & C_{31K_i} & C_{32K_i} & W_{3i} \end{bmatrix} (i = 0, 1, 2)$$

It is reasonable to assume that the measures are independent. For example, the weight and the average distance obviously are independent. The motion measures are also independent of the range and weight since they are invariant to these measures. It is, therefore, assumed that there is very little correlation between the measures and the cross-correlation terms are taken to be zero. The auto-correlation terms being one, the above equation then simplifies down to:

$$\Pr(M_0, M_1, M_2, M_3 | S_i) = \prod_{j=0}^{3} \Pr(M_j | S_i)$$

Therefore, the probability of the four measures given a particular scenario is:

$\Pr\{(\bar{x}, \sigma^2, \bar{w}, \delta) | RFIS\} = \Pr(\bar{x}|RFIS) \Pr(\sigma^2|RFIS) \Pr(\bar{w}|RFIS) \Pr(\delta|RFIS)$ $\Pr\{(\bar{x}, \sigma^2, \bar{w}, \delta) | ES\} = \Pr(\bar{x}|ES) \Pr(\sigma^2|ES) \Pr(\bar{w}|ES) \Pr(\delta|ES)$ $\Pr\{(\bar{x}, \sigma^2, \bar{w}, \delta) | PSN\} = \Pr(\bar{x}|PSN) \Pr(\sigma^2|PSN) \Pr(\bar{w}|PSN) \Pr(\delta PSN)$ Then using Baye's rule, the probability of a scenario given the four measures is calculated as:

$$\Pr(S_i | M_0, M_1, M_2, M_3) = \frac{\Pr(M_0, M_1, M_2, M_3 | S_i) \Pr(S_i)}{\sum_{k=0}^{2} \Pr(M_0, M_1, M_2, M_3 | S_k) \Pr(S_k)} \quad (4)$$

for i=0,1,2 i.e.

$$\Pr\{RFIS \mid (\bar{x}, \sigma^2, \bar{w}, \delta)\} = \frac{\Pr\{(\bar{x}, \sigma^2, \bar{w}, \delta) \mid RFIS\}\Pr(RFIS)}{\Pr\{(\bar{x}, \sigma^2, \bar{w}, \delta) \mid RFIS\}\Pr(RFIS) + \Pr\{(\bar{x}, \sigma^2, \bar{w}, \delta) \mid ES\}\Pr(ES) + \Pr\{(\bar{x}, \sigma^2, \bar{w}, \delta) \mid PSN\}\Pr(PSN)} \quad (5)$$

$$\Pr\{ES \mid (\bar{x}, \sigma^2, \bar{w}, \delta)\} = \frac{\Pr\{(\bar{x}, \sigma^2, \bar{w}, \delta) \mid ES\}\Pr(ES)}{\Pr\{(\bar{x}, \sigma^2, \bar{w}, \delta) \mid RFIS\}\Pr(RFIS) + \Pr\{(\bar{x}, \sigma^2, \bar{w}, \delta) \mid ES\}\Pr(ES) + \Pr\{(\bar{x}, \sigma^2, \bar{w}, \delta) \mid PSN\}\Pr(PSN)} \quad (6)$$

$$\Pr\{PSN \mid (\bar{x}, \sigma^2, \bar{w}, \delta)\} = \frac{\Pr\{(\bar{x}, \sigma^2, \bar{w}, \delta) \mid PSN\}\Pr(PSN)}{\Pr\{(\bar{x}, \sigma^2, \bar{w}, \delta) \mid RFIS\}\Pr(RFIS) + \Pr\{(\bar{x}, \sigma^2, \bar{w}, \delta) \mid ES\}\Pr(ES) + \Pr\{(\bar{x}, \sigma^2, \bar{w}, \delta) \mid PSN\}\Pr(PSN)} \quad (7)$$

Accordingly, this provides three probabilities, i.e. probabilities of the three scenarios, given the four measures, and from which the most probable scenario can be found. The airbag is then enabled or disabled depending on what the most probable scenario warrants. A flag is used to enable or disable with an empty seat. If it is desired to disable the airbag for an empty seat, then the sum of the probability of RFIS and empty seat determines whether the airbag should be disabled. This probability is compared with a threshold and if it is above this threshold then the airbag is disabled.

The algorithm may be made to run without using one or more measures. For example, it may be desired to see how well the algorithm performs in its detection capability with only the optical sensor. In this case a flag is used to disable the use of the weight measure in the algorithm. In that case, the probabilities of weight given the individual scenarios are set to 1, i.e.

$$\Pr(\bar{w}|RFIS)=\Pr(\bar{w}|ES)=\Pr(\bar{w}|PSN)=1$$

Equations (1), (2) and (3) therefore reduce to:

$$\Pr\{(\bar{x}, \sigma^2, \delta)|RFIS\}=\Pr(\bar{x}|RFIS)\ \Pr(\sigma^2|RFIS)\ \Pr(\delta|RFIS) \quad (8)$$

$$\Pr\{(\bar{x}, \sigma^2, \delta)|ES\}=\Pr(\bar{x}|ES)\ \Pr(\sigma^2|ES)\ \Pr(\delta|ES) \quad (9)$$

$$\Pr\{(\bar{x}, \sigma^2, \delta)|PSN\}=\Pr(\bar{x}|PSN)\ \Pr(\sigma^2|PSN)\ \Pr(\delta|PSN) \quad (10)$$

The probabilities of the scenarios thus reduce to:

$$\Pr\{RFIS \mid (\bar{x}, \sigma^2, \delta)\} = \frac{\Pr\{(\bar{x}, \sigma^2, \delta) \mid RFIS\}\Pr(RFIS)}{\Pr\{(\bar{x}, \sigma^2, \delta) \mid RFIS\}\Pr(RFIS) + \Pr\{(\bar{x}, \sigma^2, \delta) \mid ES\}\Pr(ES) + \Pr\{(\bar{x}, \sigma^2, \delta) \mid PSN\}\Pr(PSN)} \quad (11)$$

$$\Pr\{ES \mid (\bar{x}, \sigma^2, \delta)\} = \frac{\Pr\{(\bar{x}, \sigma^2, \delta) \mid ES\}\Pr(ES)}{\Pr\{(\bar{x}, \sigma^2, \delta) \mid RFIS\}\Pr(RFIS) + \Pr\{(\bar{x}, \sigma^2, \delta) \mid ES\}\Pr(ES) + \Pr\{(\bar{x}, \sigma^2, \delta) \mid PSN\}\Pr(PSN)} \quad (12)$$

$$\Pr\{PSN \mid (\bar{x}, \sigma^2, \delta)\} = \frac{\Pr\{(\bar{x}, \sigma^2, \delta) \mid PSN\}\Pr(PSN)}{\Pr\{(\bar{x}, \sigma^2, \delta) \mid RFIS\}\Pr(RFIS) + \Pr\{(\bar{x}, \sigma^2, \delta) \mid ES\}\Pr(ES) + \Pr\{(\bar{x}, \sigma^2, \delta) \mid PSN\}\Pr(PSN)} \quad (13)$$

The probability based on distance and weight are calculated from the very beginning of the scenario. However, the variance and motion measures are not used right away for calculating probabilities. The scenario timer (scentim) has to be above a threshold (FUZTIM) to initiate the calculation of the probability based on variance and motion measures. Till then, $$\Pr(\sigma^2|RFIS)=\Pr(\sigma^2|ES)=\Pr(\sigma^2|PSN)=\Pr(\delta|RFIS)=\Pr(\delta|ES)=\Pr(\delta|PSN)=1$$

Secondary Probability calculation

Figure 15A:
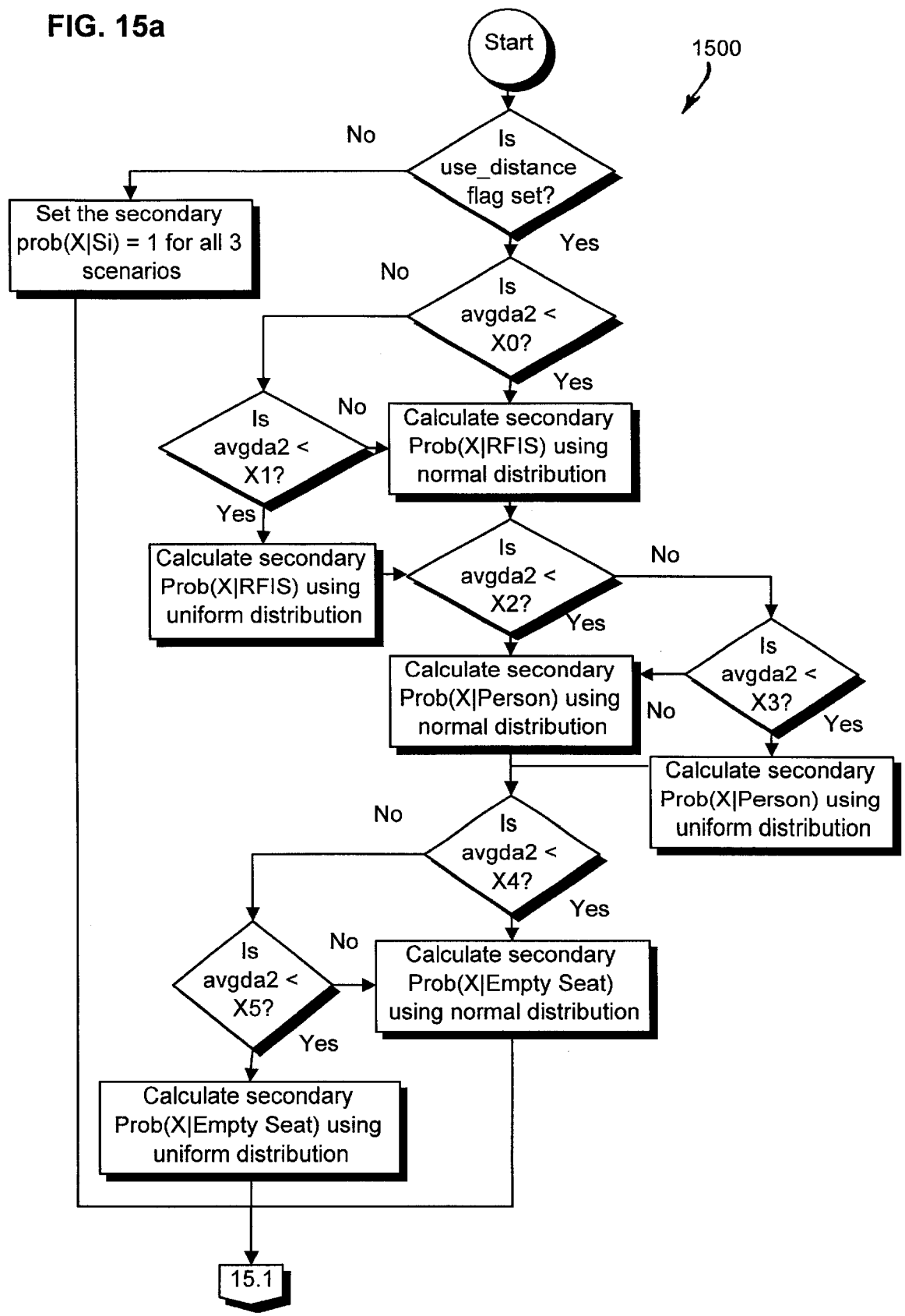
FIGS. 15a, 15b, and 15c illustrates a block diagram of a subprocess for making secondary probability calculations, in accordance with the process of FIGS. 4a, and 4b.
Figure 15B:
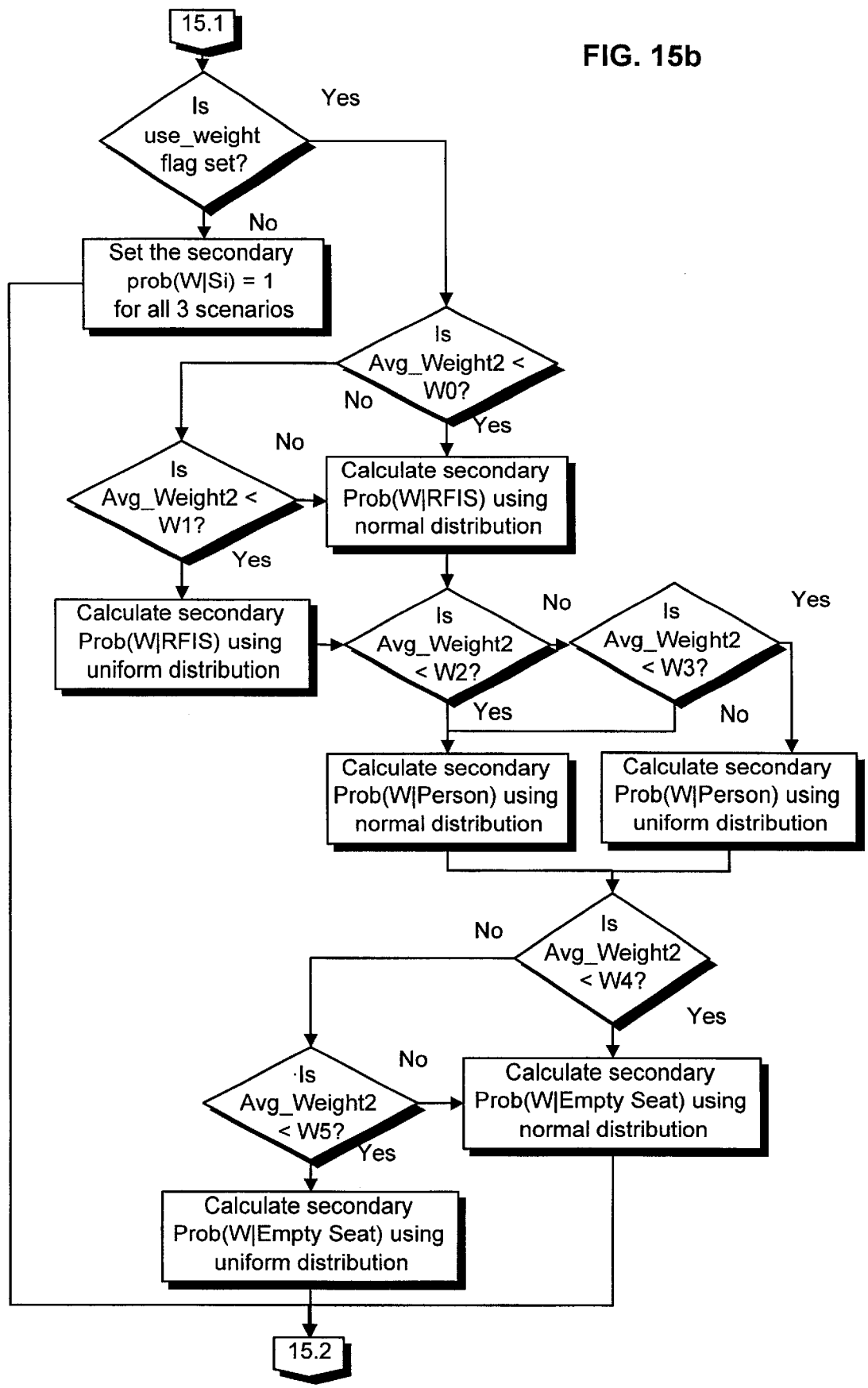
Figure 15C:
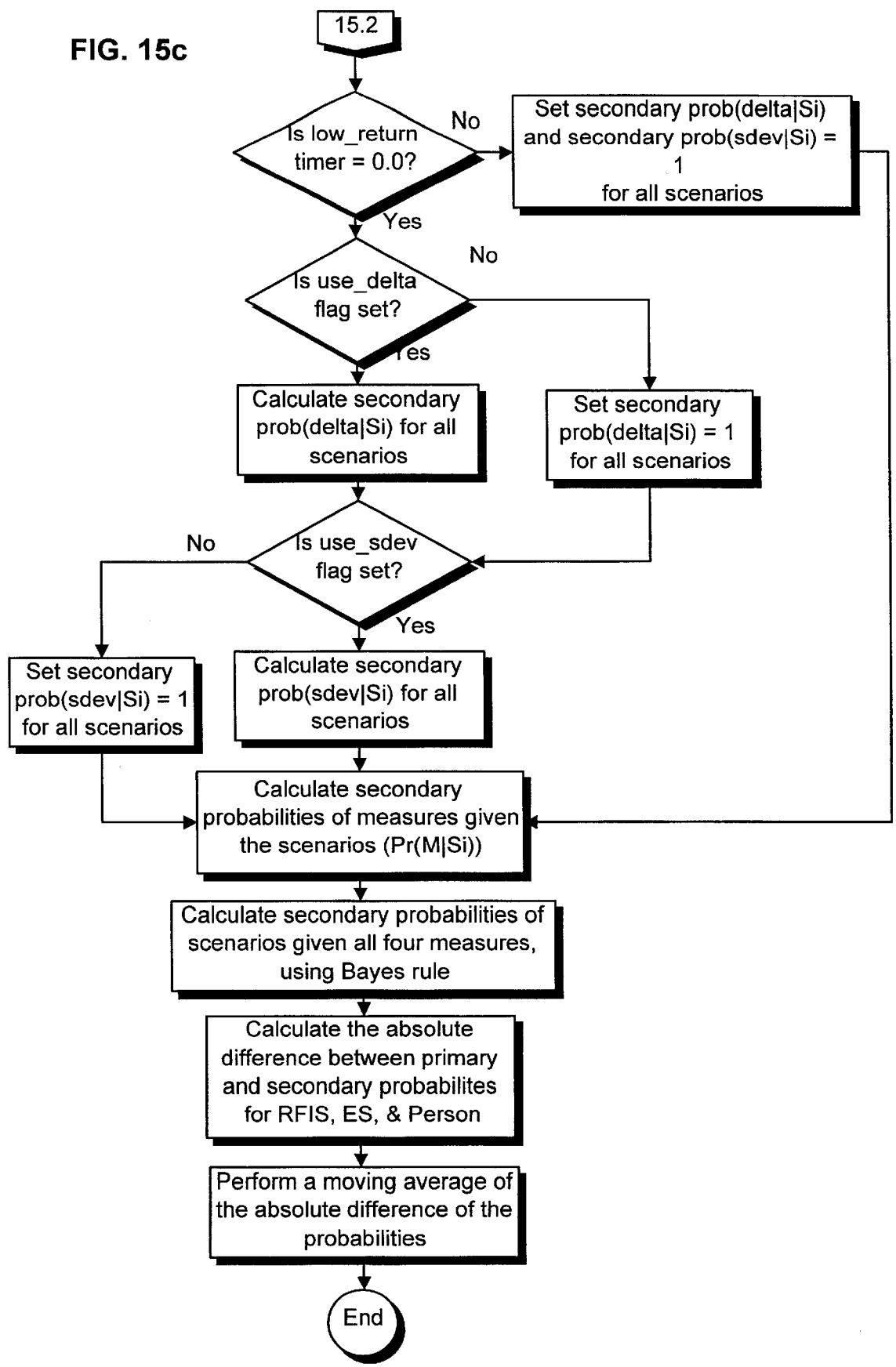

Referring to FIGS. 15a, 15b, and 15c illustrating subprocess 1500, the secondary probabilities are calculated in exactly the same manner—the only difference is that the measures used are the corresponding secondary measures. The other difference is that all four probabilities are calculated from the very beginning of the period between two consecutive big changes—there is no wait period for the initiation of the variance and motion measures because they are on going even through the occurrence of a big change.

Figure 16A:
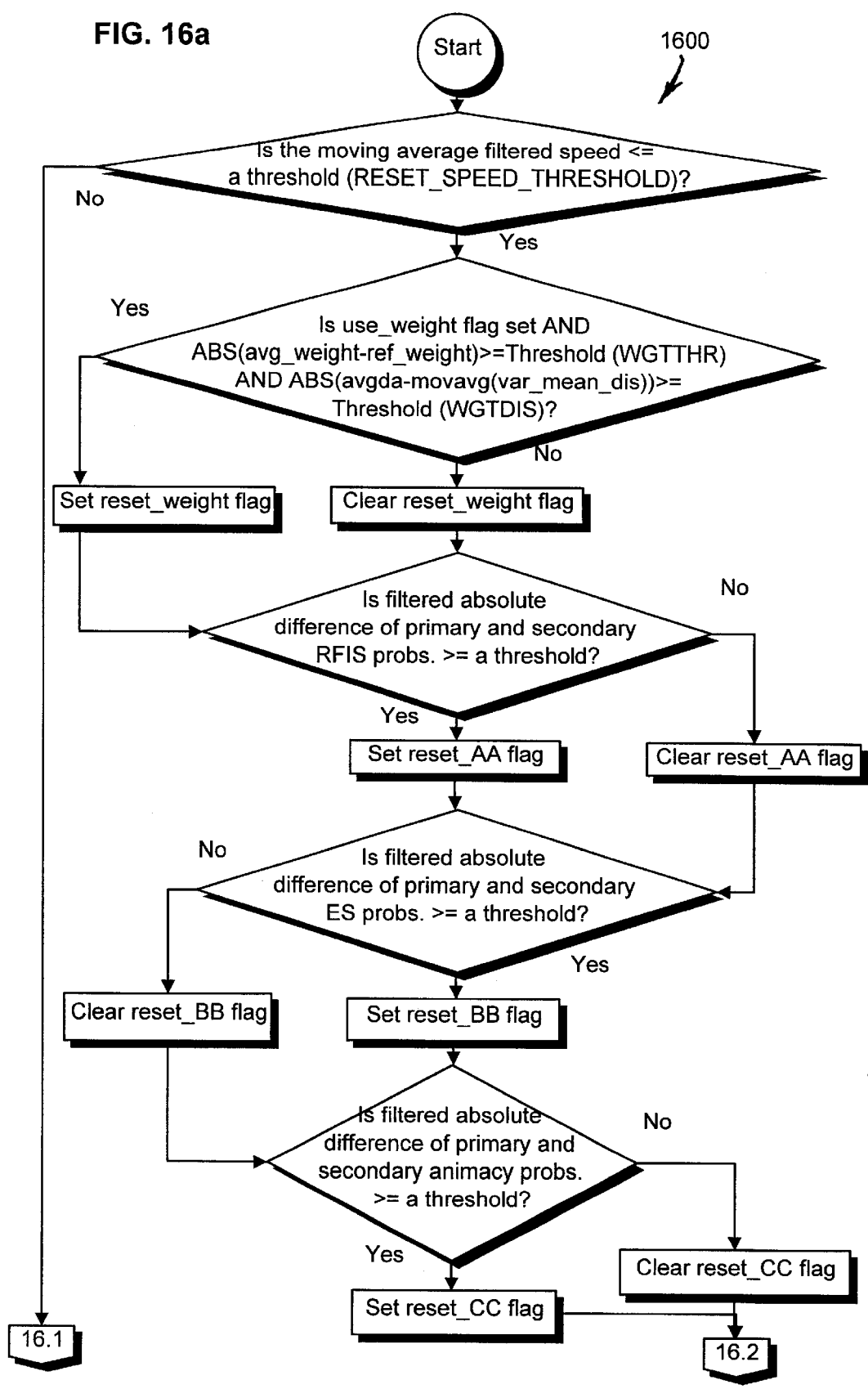
FIGS. 16a, 16b, and 16c illustrates a block diagram of a subprocess for checking for resets to the seat occupancy scenario, in accordance with the process of FIGS. 4a, and 4b.
Figure 16B:
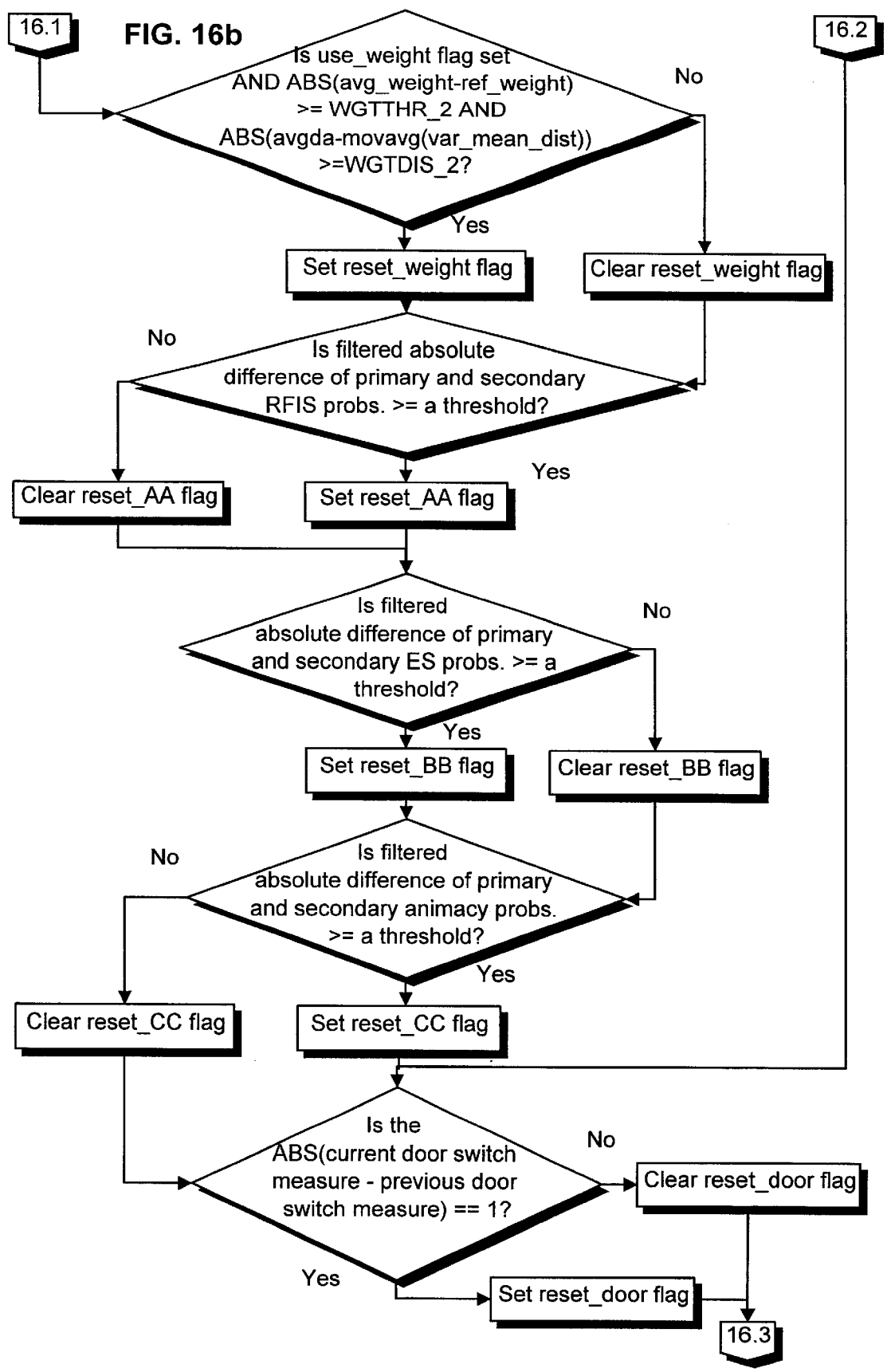
Figure 16C:
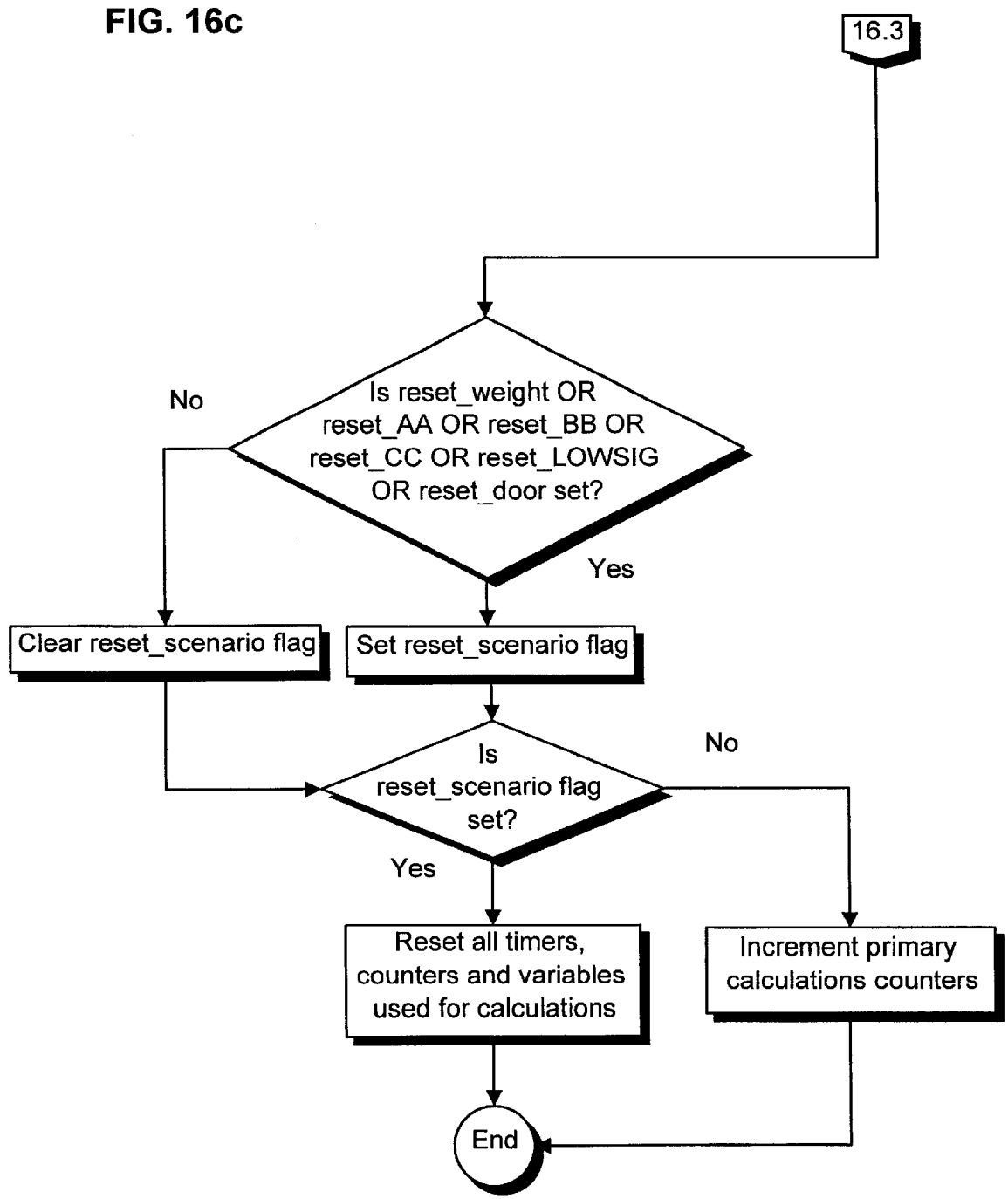

Recognition of a New Scenario:

Referring to FIGS. 16a, 16b, and 16c illustrating subprocess 1600, a new scenario can be detected using any one or more of the following five conditions:

1) Door switch: In most, if not all, cases the passenger side door will be opened and/or closed while changing a scenario. Therefore the door switch is used as the primary indicator of a change in a scenario.

2) Weight reset: The change in a scenario will also accompany a change in weight and/or distance. Therefore if the absolute change in weight and distance exceeds a threshold and this change persists for a while then the scenario is reset. The weight and distance are compared to moving average values of weight and distance so that an instantaneous change in either does not initiate the change in a scenario.

3) Resets using probabilities: This is where the secondary probabilities are used. If there has been a change in the scenario, then there will be a persistent difference in the primary and secondary probabilities of a particular scenario. This is because, the primary probabilities are calculated from the primary measures which have a long time history and are less prone to change in short duration change in pattern of the measures. The secondary probabilities, on the other hand, are measured from the secondary measures, which have a shorter time history and therefore track real changes in the measures quicker. If the scenario actually changes, then the secondary measure would indicate the new scenario, whereas the primary measures would retain memory of the previous scenario, resulting in a difference in the primary and secondary probabilities. If this change in scenario persists for a sufficient duration of time then the scenario is reset. The change in scenario is detected by integrating the absolute difference of the primary and secondary probabilities whereby if this integrated value exceeds a threshold then the scenario is reset. Resets AA, BB and CC in the algorithm are these resets in the cases of RFIS, empty seat and people respectively.

The same set of reset conditions are checked with different thresholds in the event of the vehicle being in motion. The reason for this is that it is much less likely for the scenario to change while the vehicle is in motion than when the vehicle is stationary. Therefore if the vehicle is stationary the resets are made more rapidly than when the vehicle is in motion.

Once a new scenario is detected all the measures and counters are reset.

Second Embodiment

Figure 17:
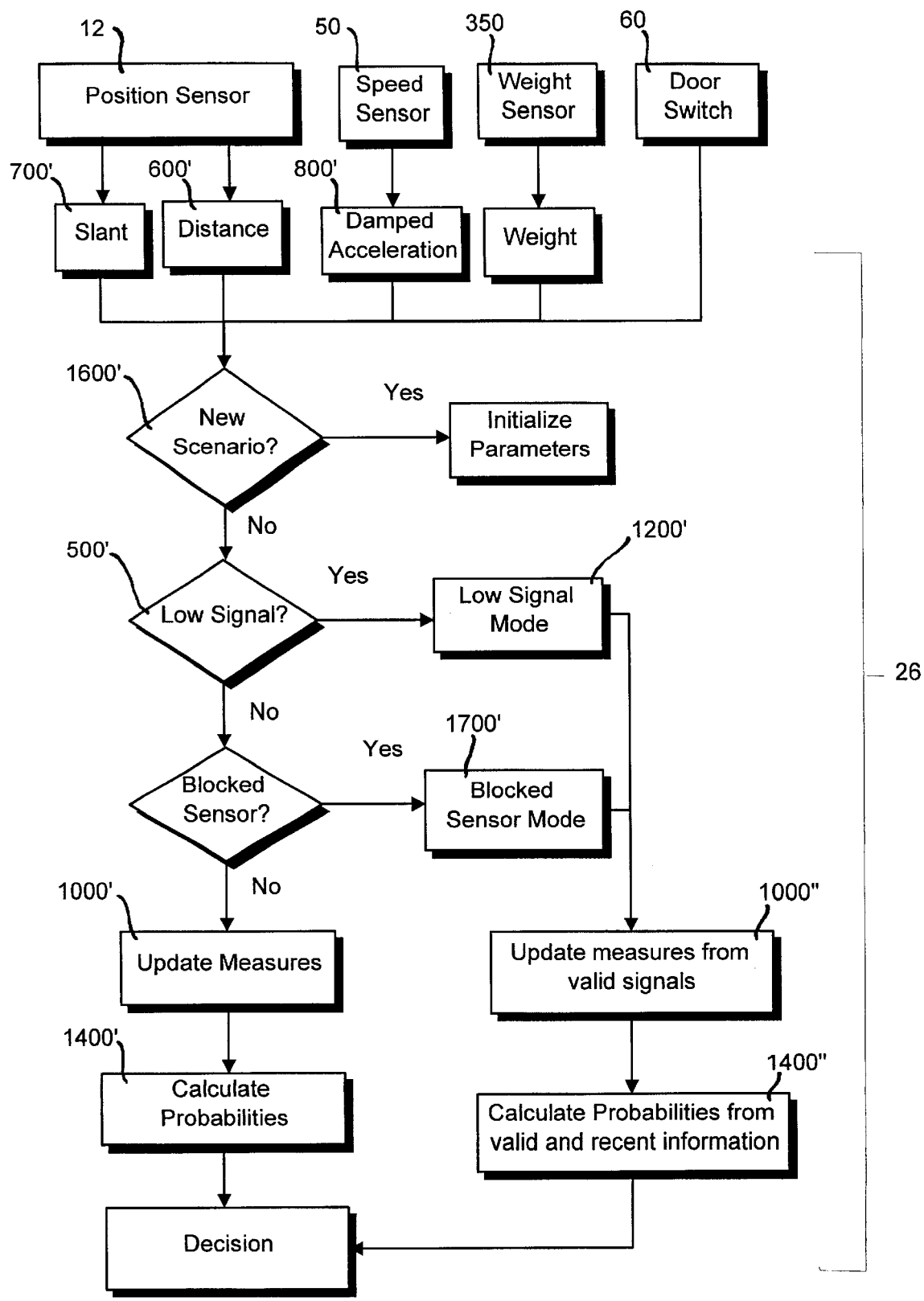
FIG. 17 illustrates an overall block diagram of a signal processing algorithm in accordance with a second embodiment of the instant invention.

A second embodiment of an occupant discrimination algorithm in accordance with the instant invention is illustrated in the block diagram of FIG. 17. Table 2 lists the pertinent parameters of the algorithm, and their associated nominal values, for parameters referenced herein.

TABLE 2

| | | |
|---|---|---|
| ANIMULT | 0.156 | |
| ANITHR | 0.55 | |
| BSMULT | 0.01 | |
| DECSLW | 0.984 | |
| DISBS | 40 | cm |
| DISSUN | 16 | cm |
| FIRETIM | 16 | cm |
| FSTBEG | 4 | sec |
| FSTEND | 8 | sec |
| NITHR | 80 | |
| PRBS | 0.5 | |
| PRNWS | 0.55 | |
| PRSLIN | 0.1 | |
| QCKTO | 45 | sec |
| QTBS | 120 | sec |
| QTNWS | 60 | sec |
| QUICK | 3.2 | sec |
| RECDEC | 0.938 | |
| SCENBS | 120 | sec |
| SEATBCK | 65 | cm |
| SEATCHG | 8 | cm |
| THINDIS | 20 | cm |
| THINSL | 0.3 | |
| THRSLW | 240 | |

The following calculations are made on an ongoing basis:

1. Distance:

The distance calculations in subprocess 600' are the same as subprocess 600 of the first embodiment.

2. Slant:

This is used for small amplitude motion detection. Small amplitude human motions such as breathing are very hard to recognize from changes in the distance measures because of noise in the distance signal. To identify these motions, the signal processor/discrimination unit 26 examines the variations in the total returned signal, I+O=IO. Because the total signal varies inversely with the square of the distance, using the total signal increases signal to noise ratio by a factor of 2. The addition of I and O also cancels any thermal PSD noise, since that noise is antisymmetric (i.e. positive noise excursions in I=negative noise excursions in O). This accounts for about 50% of the noise, thus producing an additional doubling of the signal to noise ratio. Furthermore, many human motions result in changes in the reflectance, such as created by changes in the reflection angle or color of the reflecting surface. This can further enhance the SNR.

The I and O signals are added to produce IO. A 6 point moving average of IO is done to determine sigav. This is then used to calculate a 1.5 second slant transform. At 20 Hz, this is a correlation of the sigav sequence with a 31 point sequence {−15 . . . 15}. The slant value is normalized by sigav to get the percent variation. The absolute value of the normalized factor is then multiplied by a distance factor (slant_factor) to get a result which corresponds to motion. The slant_factor is calculated as follows:

$$\text{slant\_factor} = \{(\text{avgdis}-50)*\text{SLFAC} +50\}/50$$

where SLFAC is a number between 0 and 1. A typical value is 0.7. An SLFAC of 1 would correspond to a linear distance multiplier. Because non-PSD noise tends to increase somewhat with distance, an SLFAC of less than 1 is preferably used, which gives a weaker than linear multiplication and some suppression of the non-PSD noise. This produces the final slant value (slantav).

Once certain conditions are satisfied as explained hereinbelow, the slant value is compared to a threshold for calculating the slant measure. If slantav is greater than this threshold and there has not been high acceleration, then a counter p1 is incremented, otherwise a counter n1 is incremented.

3. Speed and damped acceleration:

At first, a 12 point moving average of the speed signal is taken. Acceleration is calculated from the filtered speed signal by taking the difference between consecutive samples. The absolute value of the acceleration signal is taken and clipped to a maximum tolerable acceleration (MAXACC) to obtain absacc. A moving sum of the absolute acceleration (absacc) is calculated (accsum). The window length is MACCN. Any older value outside the window is damped and added to the moving sum to obtain effmot. The damp factor is ACCDLT. Thus, effmot is:

$$\text{effmot}(m)=1/K*[\text{accsum}(m)+\text{accacc}(m)],$$

where accacc(m)=ACCDLT*[accacc(m−1)+absacc(m−MACCN)].

Conditions:

The algorithm constantly checks for the following conditions:

1. Big change:

When two consecutive I+O signal samples go through a big change, e.g., the absolute difference between IO(n) and sigav(n−1) is greater than 12.5% of sigav(n−1) for two consecutive samples, and/or the turning on or off of a limit detector persists for two consecutive samples, then a "big change" is determined to have taken place. Two timers, i.e. quicktim (0.05 second increments) and dischtim (6.4 second increments), are started. These timers tell when the last "big change" occurred. At the same time, a set of motion counters sidn1, disp1, disn2 and disp2 are updated. These motion counters follow the same criteria as those of updating n1, p1, n2, p2.

When the next "big change" is encountered, the timers and the counters are reset. Another counter (bccnt) is incremented every time there is a "big change," thereby tracking the number of times a "big change" has been detected in a scenario. This counter is reset at the onset of a new scenario. The 32 point moving averaged distance (avgdis) prior to the big change is saved.

2. Scenario settling down:

Once a new scenario is recognized, then a flag (scenario flag) is cleared. A timer (scenario timer) starts timing. Once the "big change" timer (quicktim) counts up to a threshold (DCTIM), the scenario flag is set. If the big change timer has not timed out to the threshold because of frequent big changes, but the scenario timer has timed out to its threshold (SCTIM), i.e. the new scenario was recognized SCTIM seconds ago but the last big change was noted less than DCTIM seconds ago, then a scenario flag is set. The scenario at this stage is said to have "settled down."

Normal Operation:

Normal Operation is outlined in the flow chart of FIG. 2. As noted above, the five measures calculated during the discrimination process of the instant invention are as follows:

($M_0$) Mean distance of a scenario (avgda): From the inside (I) and outside (O) signals the distance (X) is calculated. The mean of the distance of the scenario is calculated from the very beginning of the scenario, i.e.

$$avgda(n) = \frac{1}{n}\sum_{i=1}^{n} X(i)$$

($M_1$) Maximum distance ($X_{max}$): The maximum distance since the beginning of the scenario is recorded;

(M2) Variance of the distance ($\sigma^2$): This is a measure of the large amplitude motion.

Once the scenario "settles down," a limit detector does not indicate a close proximity (i.e. "turns on"), and there is no high acceleration or deceleration present (effinot<EFFTHR), a running variance of the distance is calculated. The distance is compared to a moving average distance (Xv) as opposed to the mean distance till the present instant. The noise portion (avgda2*NLP))2 is subtracted off to get the actual variance. The variance is not updated when effmot>EFFTHR or if the limit detector turns on, because in these cases the signal level would show variance which is not induced by the actual motion of the target, but due to the vehicle acceleration/deceleration or the blocking of the optical sensor. The variance is calculated as:

$$(\sigma)=\max[1/n\, \Sigma_{i-1\, to\, n}\{X(i)-X(i)\}^2-\{avgda(n)^2*NLP\}^2, 0].$$

($M_3$) Mean weight of the scenario: A running average of the scenario mean weight is taken from the beginning of the scenario:

$$W(n)=1/n\Sigma_{i-1\, to\, n}\, w(i)$$

($M_4$) Slant measure:($\delta$): $\delta$=p1(p1+n1);

Once a new scenario is detected, all measures are initialized. The scenario flag is cleared. From then on the scenario mean distance, the maximum distance and the scenario mean weight are routinely updated. These three measures are used at this point to calculate the probability of a scenario. The variance and the slant measures are not used at this point because at the beginning of a new scenario, there may be motion (for inanimate objects) which should be disregarded. At this point, the marginal probabilities for slant and variance, i.e. $Pr(\delta S_i)$ and $Pr(\sigma^2\, S_i)$ are set to one. When the scenario "settles down," i.e., the last big change took place more than a predetermined period of time ago (DCTIM) or the scenario is a predetermined period old (SCTIM), whichever of these two takes place first, the scenario flag is set and the variance calculation begins. Once the scenario timer exceeds a threshold (FUZTIM), the probability based on variance is calculated, i.e. $Pr(\sigma^2\, S_i)$. The probability of variance given a scenario is calculated using the following formula:

$$Pr(\sigma^2\, S_i) \leftarrow Pr(\sigma^2\, S_i)*\mu+(1-\mu)*Pr(\sigma^2\, S_6);$$

where $\mu$=min [1, (p1+n1)/PNDIV], and $Pr(\sigma^2\, S_6)$ is the probability of variance given a scenario where a person is reading a newspaper. This is used as the most universal distribution because it is the flattest.

Once the scenario settles down, an element counter (elcnt) starts counting, and when the count exceeds a threshold (ELTHR), the slant measure updating is initiated and the probability based on the slant measure is calculated.

At this point the slant transform (slantav) is compared to a speed dependent threshold (thrcnta), where the threshold is calculated as follows:

thrcnta=min[SLPLIP, (THRCNT+SPDVIB*speed)]

where, THRCNT is the base slant threshold (at O speed) and SLCLIP is the maximum allowable slant value which is usually the value at approximately 60 miles per hour. SPDVIB is the incremental factor which linearly increase the overall slant threshold (THRCNTA) from a value of THRCNT at zero velocity to SLCLIP at its specified speed. This accounts for vibration induced through the motion of the vehicle.

The motion counters p1 and disp1 are incremented if the slant transform (slantav) is greater than THRCNTA and at the same time there is no detection of high acceleration or deceleration (effmot<EFFTHR). Following the same criterion, two accumulators (recani and slowani) are incremented using damp factors, i.e. rcani=recani*RECDEC+1, and slowani=slowani*DECSLW+1, where RECDEC and DECSLW are damp factors. These accumulators record the motion history of the scenario and gradually damp out older information. They are also used in detecting the onset of new scenarios.

The counters n1 and disn1 are incremented if the slant transform is less than THRCNTA regardless of the acceleration or deceleration of the vehicle. Following the same criterion, recani and slowani are decremented using damping recami=recani*RECDEC-1, and slowani= slowani*DECSLW-1. The slant measure (symbol) equals p1/(p1+n1). The slant probability is also calculated like the variance probability as follows:

$$Pr(\delta S_i) \leftarrow Pr(\delta S_i)*\mu+(1-\mu)*Pr(\delta S_i);$$

where $\mu$=min[1, (p1+n1)/PNDIV], and $Pr(\delta S_i)$ is the probability of slant measure given the scenario is a front facing infant seat. Since the distribution is uniform, this probability is a constant.

Signal processor/discrimination unit 26 routinely monitors the signals from the optical sensor to determine if the optical sensor is blocked or the signal reflected off the target has a low signal to noise ratio. Once that happens, signal processor/discrimination unit 26 operates in one of a plurality of a fall back modes to continue assessing the other factors using the available useful signals. These fall back modes are as follows:

1. Blocked sensor:

When active infrared position detector 12 is blocked, signal processor/discrimination unit 26 continues situation assessment with the remaining available signals. If active infrared position detector 12 is blocked from the very beginning of the scenario, then the assessment is based on the slant measure, variance and weight. The marginal probabilities based on distance and maximum distance are set to one, thus de-emphasizing them. If active infrared position detector 12 becomes blocked sometime within the scenario, then the maximum distance is also used. In this situation, only the marginal probability of the distance is set to one.

2. Low Signal:

In the event of a low returned signal as may happen with the target object having a highly non reflecting surface, signal processor/discrimination unit 26 becomes "blinded" as the signal to noise ratio becomes low. The scenario mean distance, the scenario maximum distance, the scenario variance and the slant measures are saved. After the onset of the low signal mode, for a certain period these four saved measures are used along with the scenario mean weight. After that period is over, the saved information is deemed too old and signal processor/discrimination unit 26 continues situation assessment using only weight. In this situation, the airbag is disabled with an empty seat even if under normal circumstances the airbag is required to be enabled with an empty seat. This is due to the fact that a rfis and an empty seat would both be in the same weight range.

More specifically, if the LED value exceeds a threshold (WLEDTH) and the IO signal falls below a threshold (WIOTH), then the returned optical signal has a low signal to noise ratio. Let us assume this is the first time the low signal mode is being entered. A flag (lowsignal_flag) is set to denote that signal processor/discrimination unit 26 is in the low signal mode.

A timer (lowsig_timer) starts timing to tell how long signal processor/discrimination unit 26 operates in the low signal mode. The information prior to entering the low signal mode is saved. If the scenario is fairly new, then the saved information is deemed to not be "mature" enough, i.e. substantial time history has not been built up. This is determined if the scenario timer is lower than a threshold (WSECNTM). In such a situation, only the scenario average weight is used to calculate the overall probability. The other marginal probabilities are set to one. Also, the same is done if signal processor/discrimination unit 26 has been in the low signal mode for a long time, in which case all saved information is deemed to be too old. This is determined by lowsig_timer exceeding a threshold (WLSGTM).

When the low signal period is over, lowsignal_flag is cleared and a timer (low_return_timer) starts timing out from a maximum value (MAXRET). This timer permits the slant information to build up again, i.e. the slant array is filled with pertinent samples. A flag (low_ret_flag) is set to denote the "recovery period," while the lowsig_timer continues to count.

Signal processor/discrimination unit 26 continues its operation by comparing the lowsig_timer against a threshold (LSGTTHR). Once this threshold is exceeded, the scenario is reset. If not, then signal processor/discrimination unit 26 continues its operation using all the measures. During the "recovery period," the low_return_timer is decremented and if it times out before the lowsig_timer exceeds LSCTTHR, then the following checks are made to make sure that the scenario has not changed. At this time low_ret_flag is cleared to denote the end of the "recovery period". A new scenario is considered to have taken place if any one of the following occurs:

1. the scenario is animate (Probability of animacy {Pr(Animate)} is greater than a threshold {ANITHR}) and one of the motion history measures (Aniquick) denotes inanimacy, i.e. Aniquick is less than a threshold (sigavt*ANIMULT), where sigavt is the saved sigav value prior to entering the low signal mode, and ANIMULT is a multiplying factor); or
2. The scenario is inanimate [Pr(Animate)<ANITHR] and there has been a big change in the distance since the onset of the low signal mode, i.e. the absolute difference between the saved distance prior to entering the low signal mode and the 32 point moving average distance (avgdis) is greater than a threshold (DISSUN); or
3. The scenario is inanimate [Pr(Animate)<ANITHR] and there has not been a big change in the distance since the onset of the low signal mode, i.e. the absolute difference between the saved distance prior to entering the low signal mode and the 32 point moving average distance (avgdis) is less than a threshold (DISSUN), and the motion history measure (Aniquick) indicates motion, i.e. Aniquick>sigavt *ANIMULT.

Finally, as discussed above, an important factor is to recognize a new scenario and restart all calculations. A key trigger indicating a new scenario is operation of the door switch, because in most cases the passenger side door will be opened and closed. However, in the low probability event of the passenger side door not being used, then signal processor/discrimination unit 26 uses the following reset paths. As assessment process builds up confidence over time, a determination that a new scenario has occurred is not made simply because there has been a sudden change in the pattern of the signals. For example, if signal processor/discrimination unit 26 has detected a baby seat for ten minutes, and the driver shifts the baby seat momentarily, this is not indicative of a new scenario.

However, if the baby seat were actually being taken out from the seat without opening or closing a door, say, in the case of a convertible, then this change in the pattern of motion would persist, and signal processor/discrimination unit 26 would eventually decide that a new scenario has occurred.

The time it takes to recognize new scenarios varies depending on which reset path initiated the new scenario. Each of these paths are governed by multiple checks which are in turn controlled by adjustable parameters or thresholds. The reset paths are as follows:

Reset A:

The scenario is reset if the following conditions are satisfied:

1. A "big change" has occurred;
2. The seatback flag (stbkchg) is cleared;
3. A certain time has elapsed since the last "big change" (quicktim>QUICK);
4. The distance is greater than the seatback distance (avgdis>SEATBCK);
5. Some motion history has built up (recani>NITHR);
6. The scenario has existed for a while (scenario timer>SCENLM); and
7. The probabilities show inanimacy (Pr(person)<= PERLM).

Reset B:

A new scenario is recognized if:

1. A big change has occurred;
2. The seatback flag (stbkchg) is cleared;
3. A certain time has elapsed since the last big change (quicktim>QUICK);
4. The distance is greater than the seatback (avgdis>SEATBCK); and
5. There has not been much motion built up (recani<NITHR).

Reset B':

A new scenario is recognized if:

1. A certain time has elapsed since the last big change (quicktim=QCKTO);
2. The distance is greater than the seatback (avgdis>SEATBCK);
3. There has not been much motion recently (recabu<NITHR); and
4. The seatback flag (stbkchg) is set.

Reset C:
A new scenario is recognized if:
1. A certain time has elapsed since the beginning of the scenario (scenario timer>SCENBS);
2. The distance is less than the average baby seat distance in the rear facing mode (avgdis <=DISBS);
3. The probability of rear facing infant seat is low Pr(rfis)<PRBS);
4. Inanimacy has been noted since the last big change (disn1>BSMULT*disp1);
5. A certain time has elapsed since the last big change (quicktim>QTBS); and
6. The current scenario is not a person reading a newspaper (Pr(PRN)<PRNWS).

If conditions 4 or 5 are not satisfied but quicktim>QTNWS, then the scenario is reset. This reset path is a "fail safe" reset to correct a situation in which a rear facing infant seat has been incorrectly classified as something else.

Reset D:
A new scenario is recognized if:
1. A big change has occurred; and
2. The seatback flag is set (indicating a recent sighting of the seat back). This reset path is to recognize a change from an empty seat.

Reset E:
When a certain time has elapsed since the last big change (quicktim=FSTBEG), the current filtered I+O value (sigav) is stored to be used as a reference value (sigavref) to be used in this pass. The motion indication "aniquick" is cleared. From this instant on until quicktim is equal to FSTEND, aniquick is incremented with the absolute difference of the current sigav value and the reference sigav value. At the end of this period, a new scenario is recognized if:
1. The distance is greater than the seatback (avgdis>SEATBCK);
2. The filtered distance (avgdis) is greater than the distance prior to the big change by a threshold (SEATCHG);
3. Aniquick is less than a threshold (ANIMULT*sigavref); and
4. The scenario is at least 12.8 seconds old.
In this case, the seatback flag (stbkchg) is set.

Reset F:
A new scenario is recognized if:
1. The scenario timer is greater than a threshold (FIRETIM);
2. If the slant measure ($\delta$) denotes inanimacy ($\delta$<THINSL); and
3. There has been a substantial change in the distance (avgdis−avgda>=THINDIS).

Reset G:
A new scenario is recognized if:
1. The scenario timer is greater than a threshold (FIRETIM);
2. The motion accumulator slowani denotes animacy (slowani>=THRSLW); and
3. The current state of the probabilities denote inanimacy (Pr(inanimacy)>PRSLIN).

Weight reset:
If there is a big change in weight as well as the distance persisting for a substantial period of time, then the scenario is reset. Here the scenario mean weight and distance are compared to moving averaged weight and distance so as not to reset with instantaneous changes in the weight and distance. The change in weight and distance are compared to their respective thresholds (WGTTHR and WGTDIS respectively).

A decision on whether to disable the airbag(s) is made at the end of every cycle is based on the calculated probabilities. The probability of scenarios which warrant the disabling of the airbag are added. If this sum exceeds a threshold (LMBS), then the airbag is disabled. Otherwise the airbag remains enabled. Depending on whether enabling or disabling an airbag is required where there is an empty seat, that probability is included or excluded in the above sum. Even if the requirement is to enable with an empty seat, the airbag is disabled with an empty seat if the system is in the lowsignal mode.

While specific embodiments have been described in detail in the foregoing detailed description and illustrated in the accompanying drawings, those with ordinary skill in the art will appreciate that various modifications and alternatives to those details could be developed in light of the overall teachings of the disclosure. Accordingly, the particular arrangements disclosed are meant to be illustrative only and not limiting as to the scope of the invention, which is to be given the fill breadth of the appended claims and any and all equivalents thereof.

We claim:
1. A system for discriminating the condition of seat occupancy by an object on a vehicle seat and for controlling the activation of a safety restraint system responsive thereto, comprising:
a) a plurality of sensors, each one of said plurality of sensors generating at least one distinct measurement, said plurality of sensors generating a plurality of measurements, wherein said plurality of sensors comprises at least one object position sensor, and said object position sensor is an optical sensor comprising:
  i) a collimated optical beam;
  ii) a position sensitive detector comprising a distributed photosensitive device; and
  iii) a lens for imaging light onto said position sensitive detector from said optical beam reflected from the object, whereby said position sensitive detector generates a plurality of measurements responsive to current signals from the distal ends of said position sensitive detector responsive to light focused on said position sensitive detector at a spot between said distal ends, the location of said focused light is responsive to the position of the object of the vehicle seat;
b) a signal processor operatively coupled to the safety restraint system;
c) a memory within said signal processor;
d) a first plurality of distinct measures, each one of said first plurality of distinct measures dependent upon at least one of said plurality of measurements, wherein said first plurality of distinct measures comprises at least one measure selected from the group consisting of a mean distance to the object, a variance of the distance to the object, a maximum distance to the object, and a mean weight of the object, said first plurality of distinct measures further comprises a slant measure, said slant measure is responsive to a slant transform of an N-point moving average of the sum of said current signals from the distal ends of said position sensitive detector, the value of said transform is compared with a first threshold, and said slant measure comprises the fraction of time for which said value of said transform exceeds said first threshold;

e) a plurality of seat occupancy scenarios, each of one of said plurality of seat occupancy scenarios having an associated a priori probability, said plurality of seat occupancy scenarios having an associated plurality of a priori probabilities; and f) a plurality of probability distributions, each one of said probability distributions providing the probability of a distinct combination of values of said first plurality of distinct measures for one of said seat occupancy scenarios, whereby said signal processor calculates a first probability of each of said plurality of seat occupancy scenarios, said first probability of each seat occupancy scenario of said plurality of seat occupancy scenarios being dependent upon i) said distinct combination of values of said first plurality of distinct measures, ii) said plurality of a priori probabilities, and iii) said plurality of probability distributions, said signal processor calculates the most likely seat occupancy scenario from said first probability of each of said plurality of seat occupancy scenarios, and the control of said safety restraint system is responsive to said most likely seat occupancy scenario.

2. The system for discriminating the condition of seat occupancy by an object on a vehicle seat and for controlling the activation of a safety restraint system responsive thereto, as recited in claim 1, wherein said plurality of sensors further comprises a sensor selected from the group consisting of a vehicle speed sensor, and a vehicle acceleration sensor, and the calculation of said slant measure does not include measurements made at times when the absolute magnitude of vehicle acceleration exceeds a threshold.

3. The system for discriminating the condition of seat occupancy by an object on a vehicle seat and for controlling the activation of a safety restraint system responsive thereto, as recited in claim 2, wherein said processor detects when said most likely seat occupancy scenario has settled down responsive to the time period since when the amount of change of at least one of said distinct measures last exceeded a threshold, and the calculation of said slant measure does not include measurements made at times when said most likely seat occupancy scenario has not settled down.

4. The system for discriminating the condition of seat occupancy by an object on a vehicle seat and for controlling the activation of a safety restraint system responsive thereto, as recited in claim 1, wherein said processor detects when said most likely seat occupancy scenario has settled down responsive to the time period since the last change in said most likely seat occupancy scenario, and the calculation of said slant measure does not include measurements made at times when said most likely seat occupancy scenario has not settled down.

5. The system for discriminating the condition of seat occupancy by an object on a vehicle seat and for controlling the activation of a safety restraint system responsive thereto, as recited in claim 1, wherein the calculation of said slant measure does not include measurements made at times when said strength of said light from said optical beam reflected from the object onto said position sensitive detector is below a threshold.

6. The system for discriminating the condition of seat occupancy by an object on a vehicle seat and for controlling the activation of a safety restraint system responsive thereto, as recited in claim 1, wherein the calculation of said slant measure does not include measurements made at times when the distance between an object and said occupant sensor is less than a threshold.

7. The system for discriminating the condition of seat occupancy by an object on a vehicle seat and for controlling the activation of a safety restraint system responsive thereto, as recited in claim 1, wherein said plurality of sensors further comprises a vehicle speed sensor, and said first threshold is responsive to a measurement of vehicle speed from said vehicle speed sensor.

* * * * *